United States Patent [19]

Mann

[11] Patent Number: 4,891,748
[45] Date of Patent: Jan. 2, 1990

[54] SYSTEM AND METHOD FOR TEACHING PHYSICAL SKILLS

[76] Inventor: Ralph V. Mann, 1515 S. E. 27 Ter., Ocala, Fla. 32671

[21] Appl. No.: 869,046

[22] Filed: May 30, 1986

[51] Int. Cl.⁴ .............................................. A63B 69/00
[52] U.S. Cl. ................................. 364/410; 273/183 R; 434/247
[58] Field of Search ................ 364/410, 247; 434/258, 434/252, 307; 273/183 R, 183 B

[56] References Cited

U.S. PATENT DOCUMENTS

| | | | |
|---|---|---|---|
| 3,408,750 | 11/1968 | McCollough et al. | 434/252 |
| 3,846,704 | 11/1974 | Bessette | 434/255 |
| 4,005,261 | 1/1977 | Sato et al. | 273/183 R |
| 4,015,344 | 4/1977 | Michaels et al. | 434/257 |
| 4,137,566 | 1/1979 | Haas | 364/410 |
| 4,163,941 | 8/1979 | Linn, Jr. | 434/252 |
| 4,337,049 | 6/1982 | Connelly | 273/183 R |
| 4,508,510 | 4/1985 | Clifford | 434/247 |
| 4,545,576 | 10/1985 | Harris | 434/247 |
| 4,607,843 | 8/1986 | Signoretti | 434/249 |

FOREIGN PATENT DOCUMENTS 2175508 12/1986 United Kingdom ................ 434/255

OTHER PUBLICATIONS

Daniel Ruby, "Biomechanics", Jan. 1982, pp. 58–60.

Primary Examiner—Jerry Smith
Assistant Examiner—Kim Thanh Tbui

[57] ABSTRACT

A system and method for teaching a student physical skills. The system includes a processing means for producing and displaying a model of the student. The processing means includes a computing means for generating the model. The model having the exact physical dimensions of the student and superiorly performs the skill. A video imaging means captures the movement of the student attempting to perform the skill and generates a video signal for effecting input into the processing means. The processing means coordinates the movement of the model with the movement of the student and generates a pixel image representation of the model overlayed on the student. The model is generated from a plurality of elite performers capable of superior performance. The model is enhanced with superior characteristics of performing the skill, but constrained to human capabilities.

22 Claims, 27 Drawing Sheets

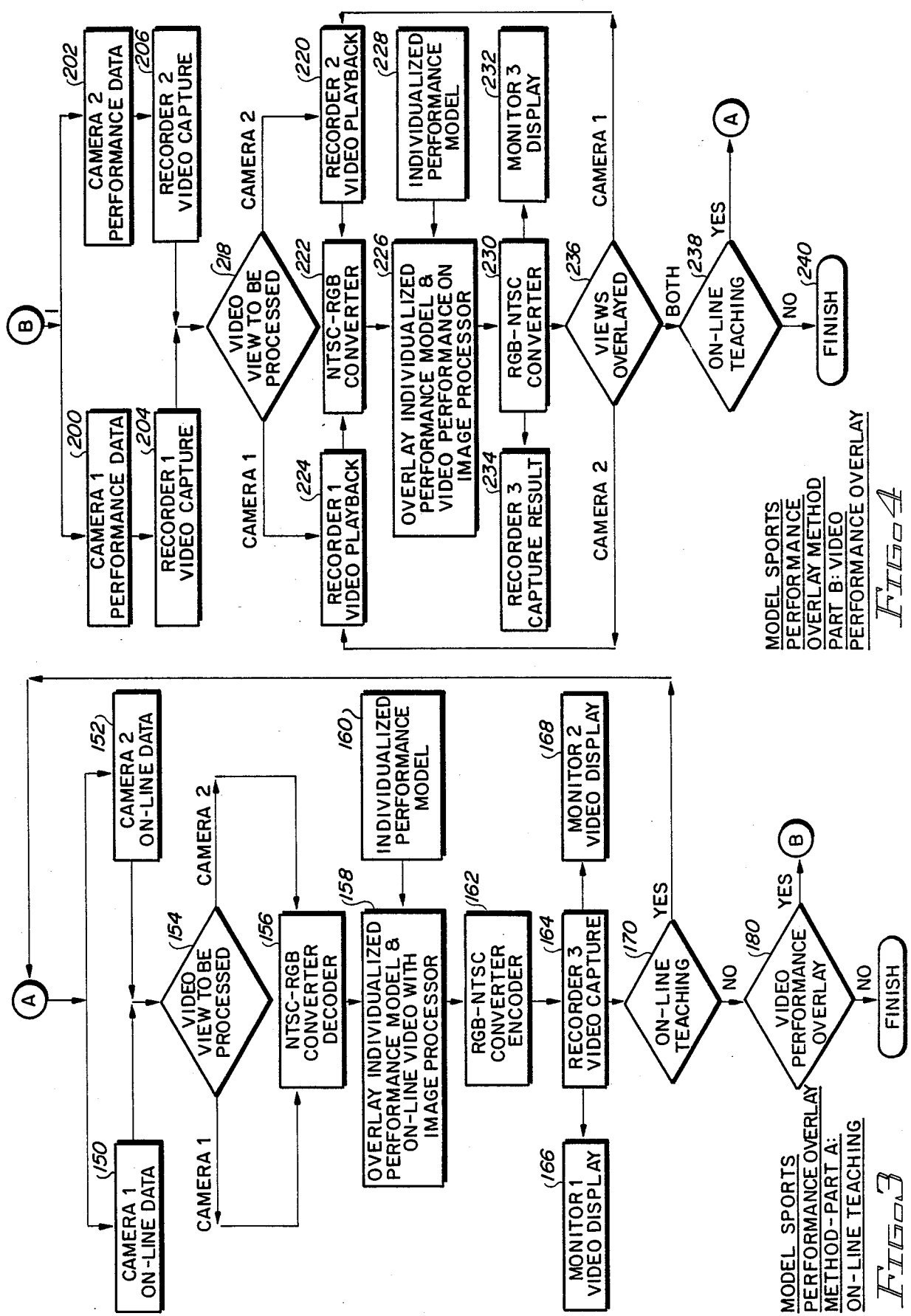

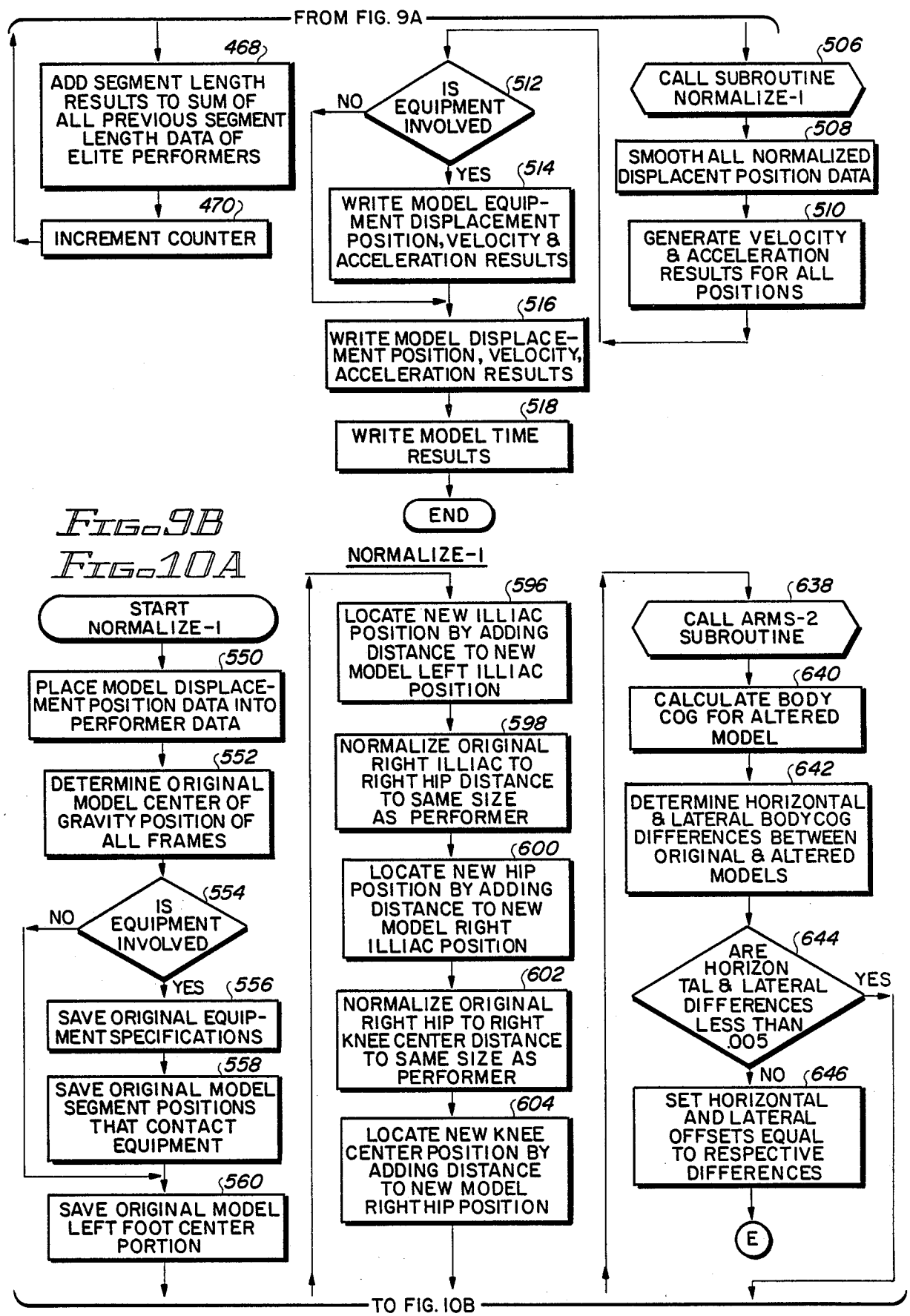

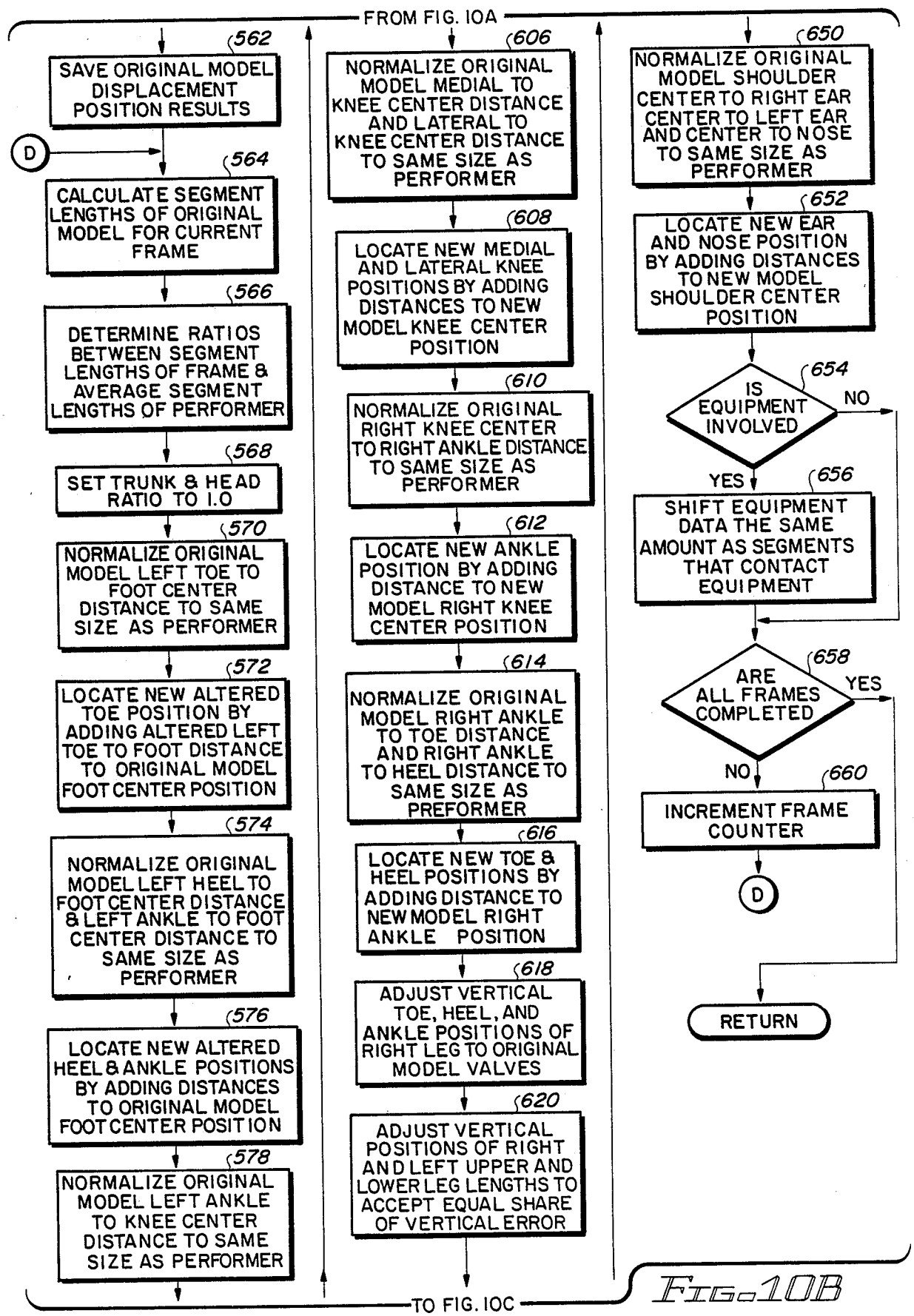

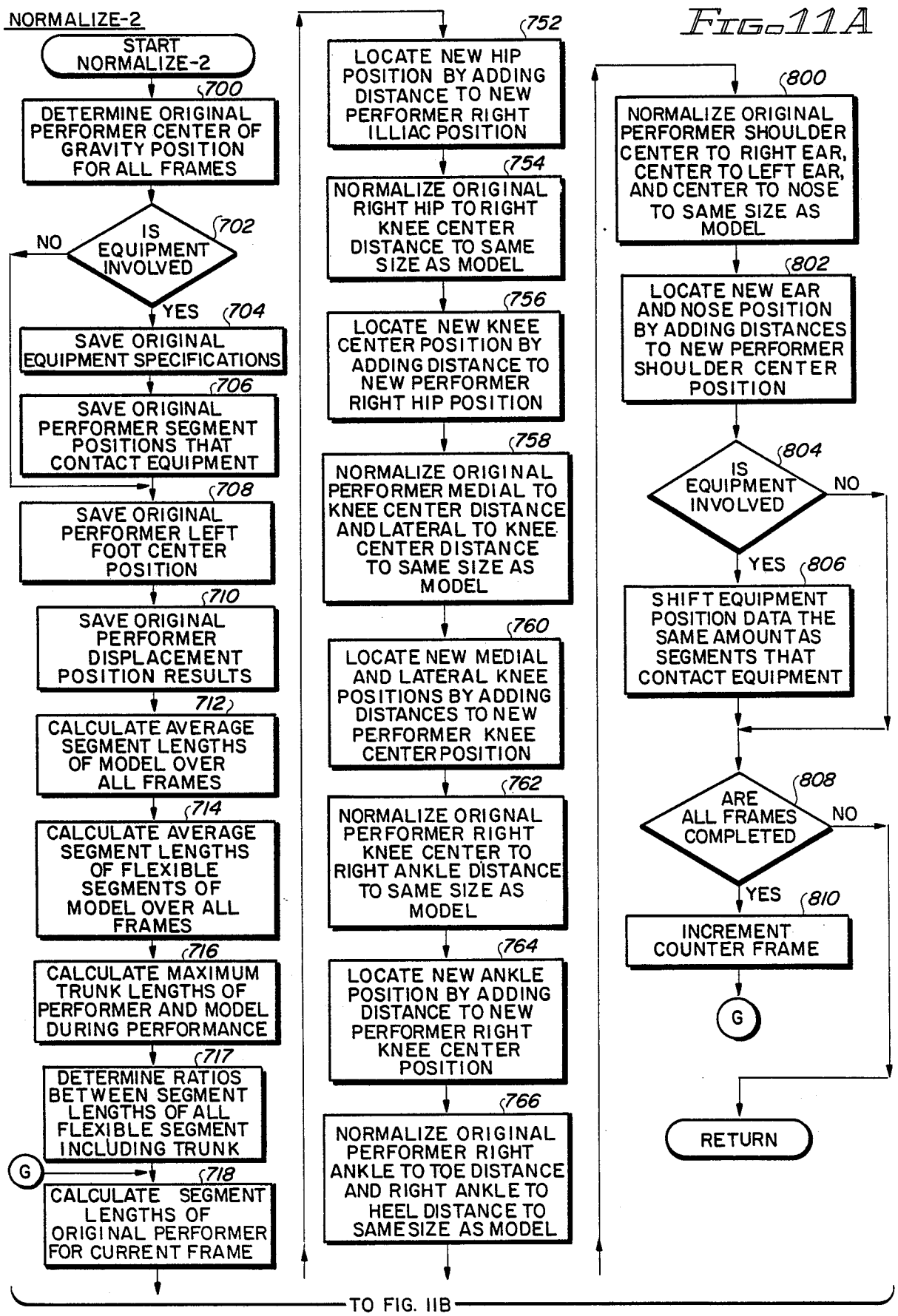

ARMS-2

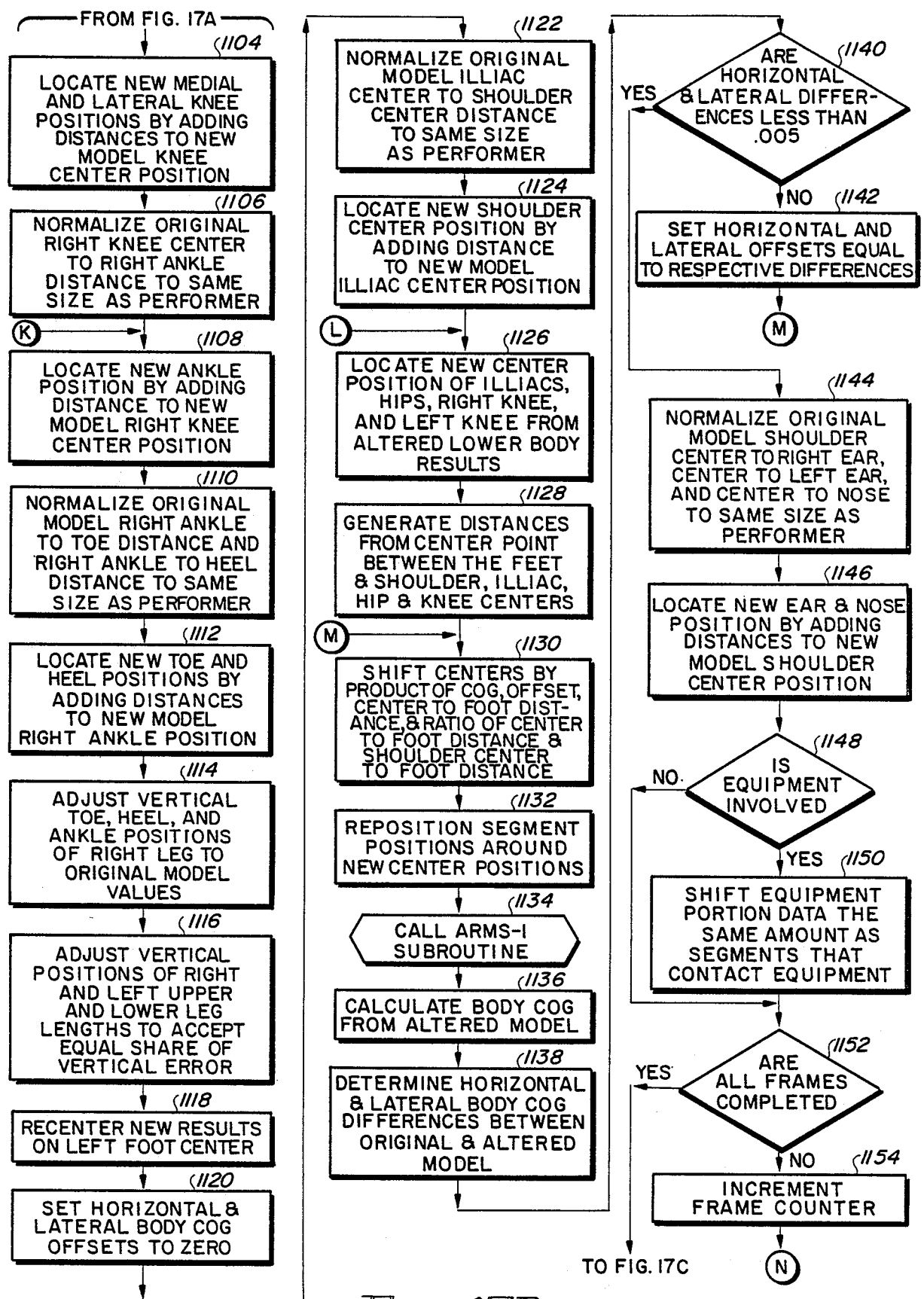

PROCESS TO GENERATE
STUDENT PERFORMANCE MODEL

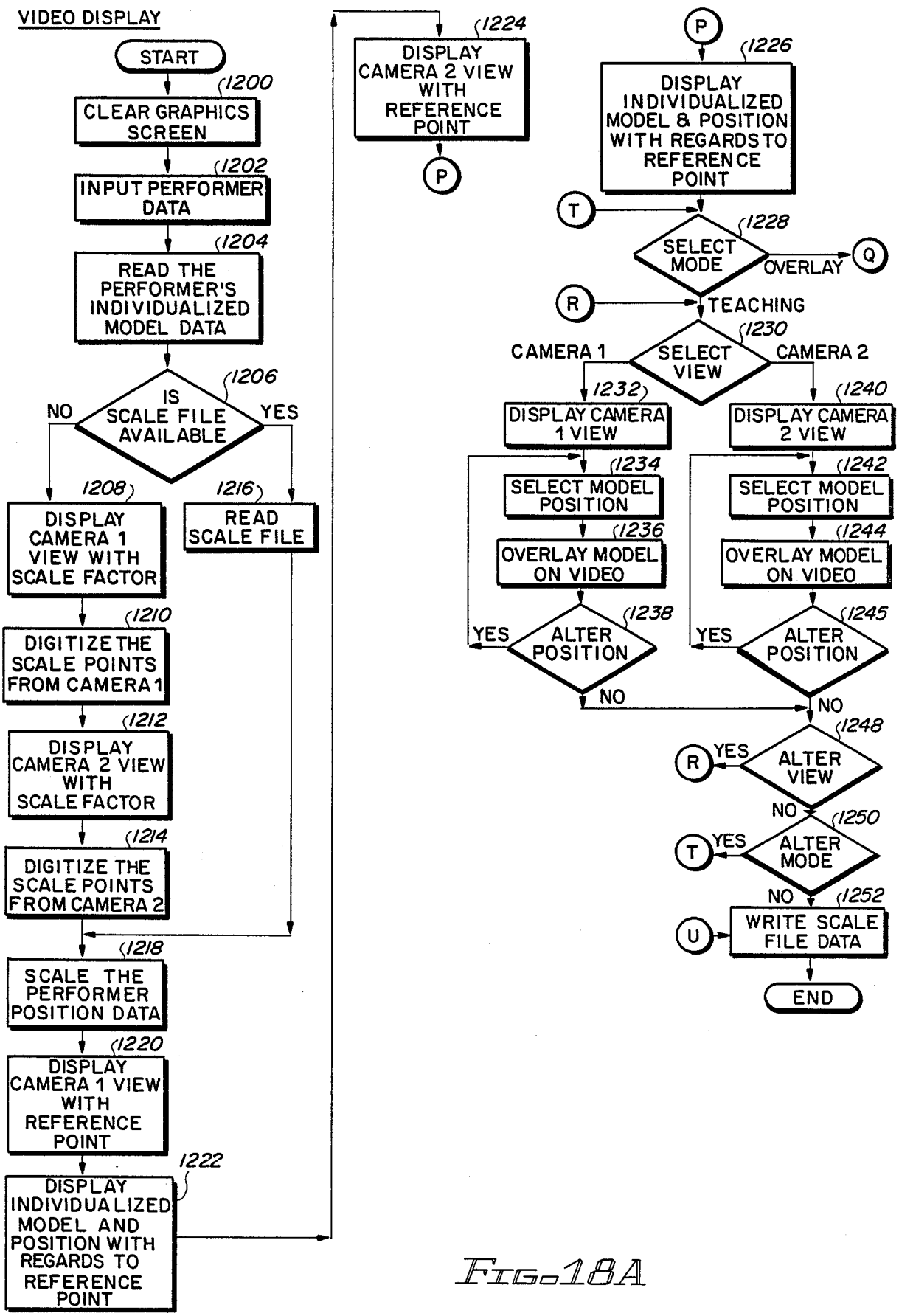

SYSTEM AND METHOD FOR TEACHING PHYSICAL SKILLS

This application contains a microfiche appendix having 21 sheets of microfiche including 1218 frames.

BACKGROUND OF THE INVENTION

1. Field of the Invention

This invention relates to a system and method for teaching physical skills and more particularly to a system and method for analyzing physical movement which require coordination in time, position of parts of the body, and movement of required equipment. It is adapted, among other possible applications, for use in improving a participant's skill in many activities such as sports and games, and is particularly applicable to golf.

2. Background Discussion

Throughout history, students have learned to perform a physical skill by watching and mimicking a teacher. For example in golf, players have looked to the best performers of the game for instruction. Professionals and amateurs alike regularly analyze the swings of elite golf performers for help with their own games. However, even when a golfer receives direct instructions from a professional teacher, the inability of the player to actually see his own performance frequently militates to slow down and limit improvement.

Attempts have been made to overcome this problem by the use of film, video equipment, and instant-development photography. Many efforts have been made, since the advent of photography, to devise systems for producing such images comparing the efforts of the student to a teacher. Several systems and methods have been proposed for producing the images described. These include U.S. Patents to McCollough et al. No. 3,408,750, Snead No. 3,353,282 and Robertson No. 2,494,000. These systems, while useful, have certain disadvantages. McCollough requires a projection of a master image made by the student posed in proper positions for comparing the student's movements to the master image. Sneed requires the projection of a teacher's image on a mirror for comparing the student's movement. Robertson displays the image of a professional golfer for comparing the students's #movements.

Three serious problems have continuously plagued these types of systems. The first problem involves the medium in which the image presentation has been made. A typical video camera or film camera has such a long exposure time that any rapid movement by the participant in performing a physical skill produces a picture blur that makes visual explanation impossible. Second, the inability to superimpose or overwrite information on the video image severely limited this type of presentation. Third, the inappropriate comparison of the student to a teacher model with different body characteristics. For instance, comparing a student with a body height of 5'3" to a teacher with a height of 6'3". The golf swings are physically different between the student and teacher causing the student to compensate for the difference to learn the skill. This increases the complexity of learning the skill.

Advances in technology have solved the first and second problems. New solid state technology now provides high speed shuttered video cameras eliminating the blurring problem once found in capturing high speed motions on video tape. New computer image generation equipment now available allows video overlays.

However, the most serious problem involved the type of results to be presented. Although the previous systems attempted to overlay information on a video movement of a performer, the information must be specific to that performer to achieve satisfactory results. The usual type of overlay information systems employed consisted of either the student being positioned in a series of positions by a teacher while recording these positions or having the student compare himself to a teacher performing the required skill. Both cases resulted in unsatisfactory performance from the student. One problem is that the student must compare his performance to an image of a teacher that is not exactly the student's shape, weight, and size. The different physical dimensions between student and teacher results in different swings. Thus, a student was forced to make a comparison in swings that could be as different as apples and oranges. Another problem is that the teacher is usually not capable of superiorly performing the physical skill. Since it is extremely unlikely that a student will have the same physical characteristics as a teacher and that a teacher had the perfect swing the previous systems were rendered ineffective.

This problem has been solved with the advent of high speed general purpose computers and recent advances in biomechanical science. The combination of biomechanics and computers has led in recent years to computer modeling of human motion.

Complex models ranging from multi-segment skeletal systems to full humanoid models are now possible. The only limitation to representing human motion with computer models lies in computer power and time required to draw the model. The major biomechanical problem is that of generating the proper computer model for performance comparisons. There are two requirements that are critical if any valid comparisons are to be made. The first requirement is that the computer generated performance must be superior to the human performance to which it is being compared. The second requirement is that the computer generated performance be within the reach of human capabilities. Since the computer is not bound by the physiological limitations of the human body, it can have its creation performed feats that no human can match. Fifty feet long jumps, 30-foot high jumps, anything is possible if no restrictions are placed on the computer generated performance.

The solution to this problem is to generate a performer with the same physical characteristics as the student, having superior movement patterns but constrained to human capabilities. The only way to accomplish this is to create this model performer using computer and graphic techniques. Using this approach entails solving a number of problems. The first involves the visual quality of the computer generated performance, since a simplistic body representation cannot portray true body positions sufficiently to effectively make comparisons. This problem is solved with development of increasingly complex humanoid representation capabilities.

SUMMARY OF THE INVENTION

Among the several objects of the present invention it may be noted the provision of a system and method for teaching a student a physical skill by providing a model having the specific physical characteristics of that participant; the provision of such system and method in which a computer generated model is superimposed on the actual motion of the student so that the student can compare his movement to a computer generated superior performer.

Another object of this invention is to provide a computer generated model capable of superiorly performing a physical skill, but constrained to human movement capabilities.

Yet another object of this invention is to provide an on-line teaching process for the student to properly compare the student's positions of the physical activity to a computer generated superior performer, in real time.

It is another object of the present invention to provide a video performance overlay process for overlaying the computer generated superior model performance on the actual video performance of the student throughout the activity of performing the physical skill.

Another object of this invention is to provide a hard copy video performance of a student for evaluation and examination by others. These as well as other objects and advantageous features of the present invention will be in part apparent and in part pointed out hereinafter.

In general, in one form of the invention for teaching a physical skill to a student comprises projecting onto a video display a moving picture of the action of a student representative of the student endeavoring to accomplish the skill. The action of a model accomplishing the same skill is projected simultaneously on the same video display and overlayed on the image of the student. The model comprises the exact physical characteristics, such as size and shape of the student. The student compares the action of the model to the image of the student for correcting the student's movement to coincide with the model's movement for teaching the physical skill to the student. The model is computer generated and includes the composite average movements of a plurality of performers performing the same skill, enhance using statistical identification of the critical performance patterns of the skill. The plurality of performers comprise a set of elite performers capable of superior performance of the skill.

The computer generated model is determined by generating a plurality of positional frames of a three-dimensional movement pattern of each elite performer performing the physical skill. The number of positional frames are standardized such that each frame corresponds to an equivalent movement position for each elite performer. The movement positions for equivalent frames are averaged together for producing an average movement pattern for an average model. The original three-dimensional movement patterns of the elite performers are then sized to the average model. The sized movement pattern of the elite performers are then averaged together for producing an elite model. Trends for superiorly performing the physical skill are then statistically identified in the movement patterns of the elite performers. The trends are enhanced in the movement patterns of the elite model to generate a superior elite model. The superior performance model is sized to the student creating an individualized superior performance model. The individualized superior performance model is then overlayed on the video action of the student for comparing the student's results to the individualized superior performance model.

While more broadly applicable, the invention permits verbal instructions to be given by a teacher simultaneously with the displayed physical action of the model. The model is posed in a fixed position to allow the student to duplicate the position of the model.

The method of the present invention also provides the capability to use a computer generated model ranging from a complex 37-segment skeletal structure, all the way up to a full figure model including flesh, bones, and clothes. Applicant has also found that the computer generated model should use a large number of excellent performers to build the computer generated model. With this approach, the common trends used by the statistical majority of elite performers to produce an excellent performance can be identified.

Also in general in one form of the invention, a system is provided for producing and displaying the computer-generated model overlayed on the image of the student. In this system, at least one video camera is positioned for providing different views of the student and generating a video signal representative of the movement of the student attempting to perform the physical skill. A decoding means converts the video signal to a computer-generated pixel image form for effecting input into an image processing means. A computer means generates the model and provides the image processing with the image of the superior performance model. The image processing means simultaneously matches the movement of the student to the superior performance model accomplishing the skill. The image processing means generates a pixel image representation of the movement of the superior performance model overlayed on the movement pattern of the student for comparing the student's movement to the model's movement.

BRIEF DESCRIPTIONS OF THE DRAWINGS

The exemplification set out herein illustrate the preferred embodiment of the invention in one form thereof, and such exemplifications are not to be construed as limiting the scope of the invention in any manner.

FIG. 3 is a broad flowchart showing the on-line teaching procedure.

FIG. 4 is a broad flowchart showing the video overlay procedure.

FIGS. 9A-9B is a detailed flowchart of Program D for generating a superior performance model.

Figure 10C:
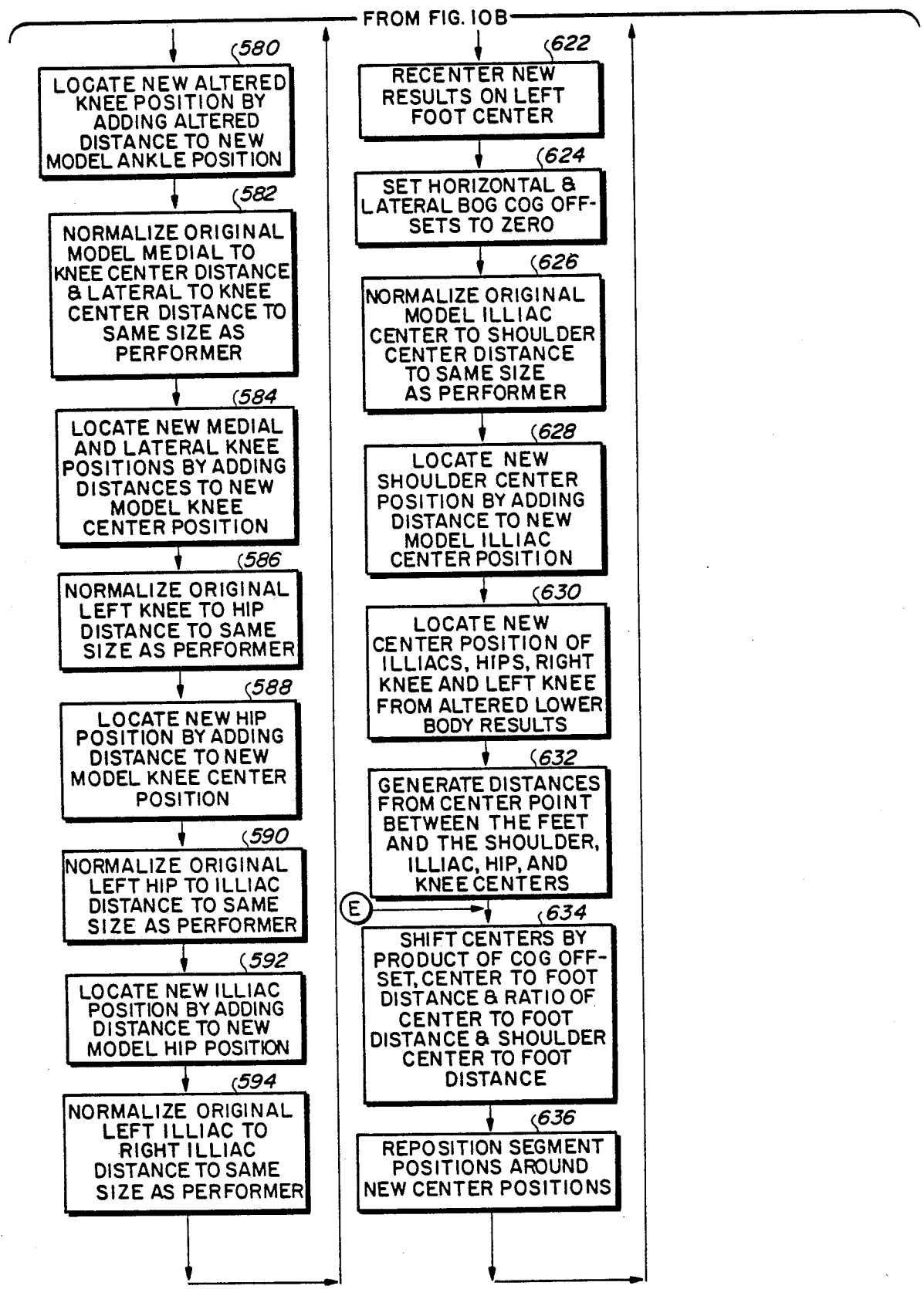

FIGS. 10A-C is a detailed flowchart for Normalize-1 routine used by program B.

Figure 11B:
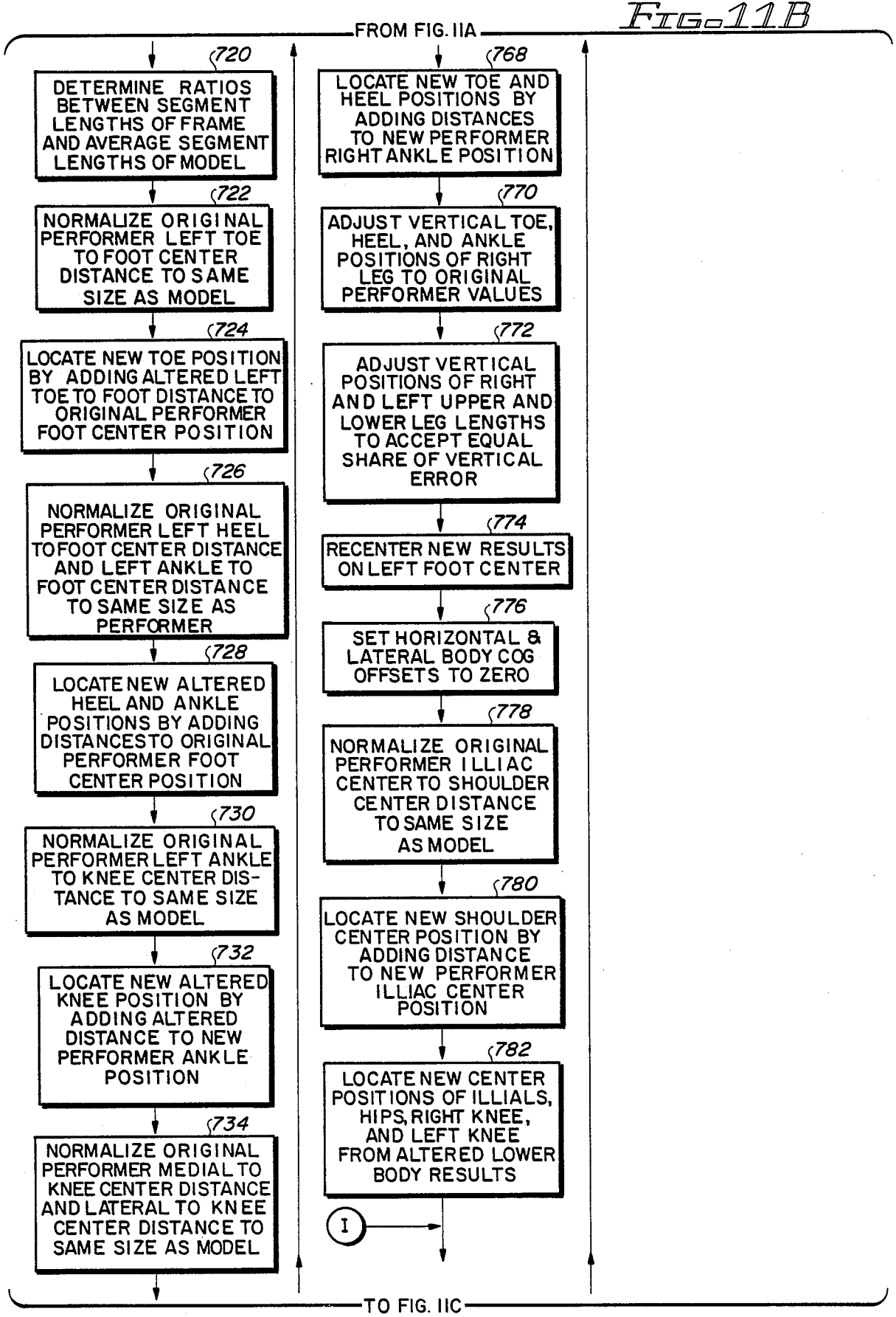
Figure 11C:
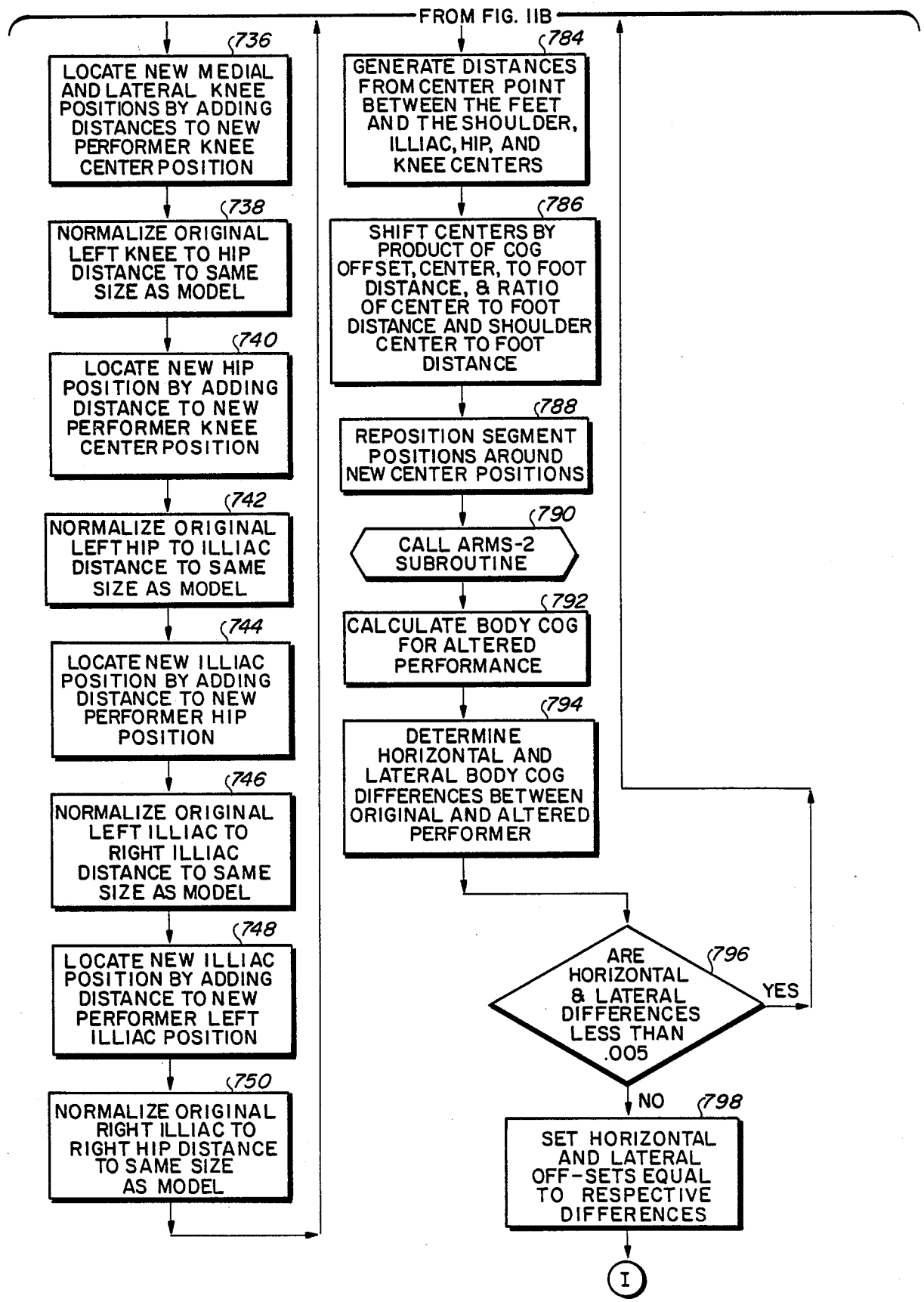

FIGS. 11A-C is a detailed flowchart for Normalize-2 routine used by program C.

Figure 12:
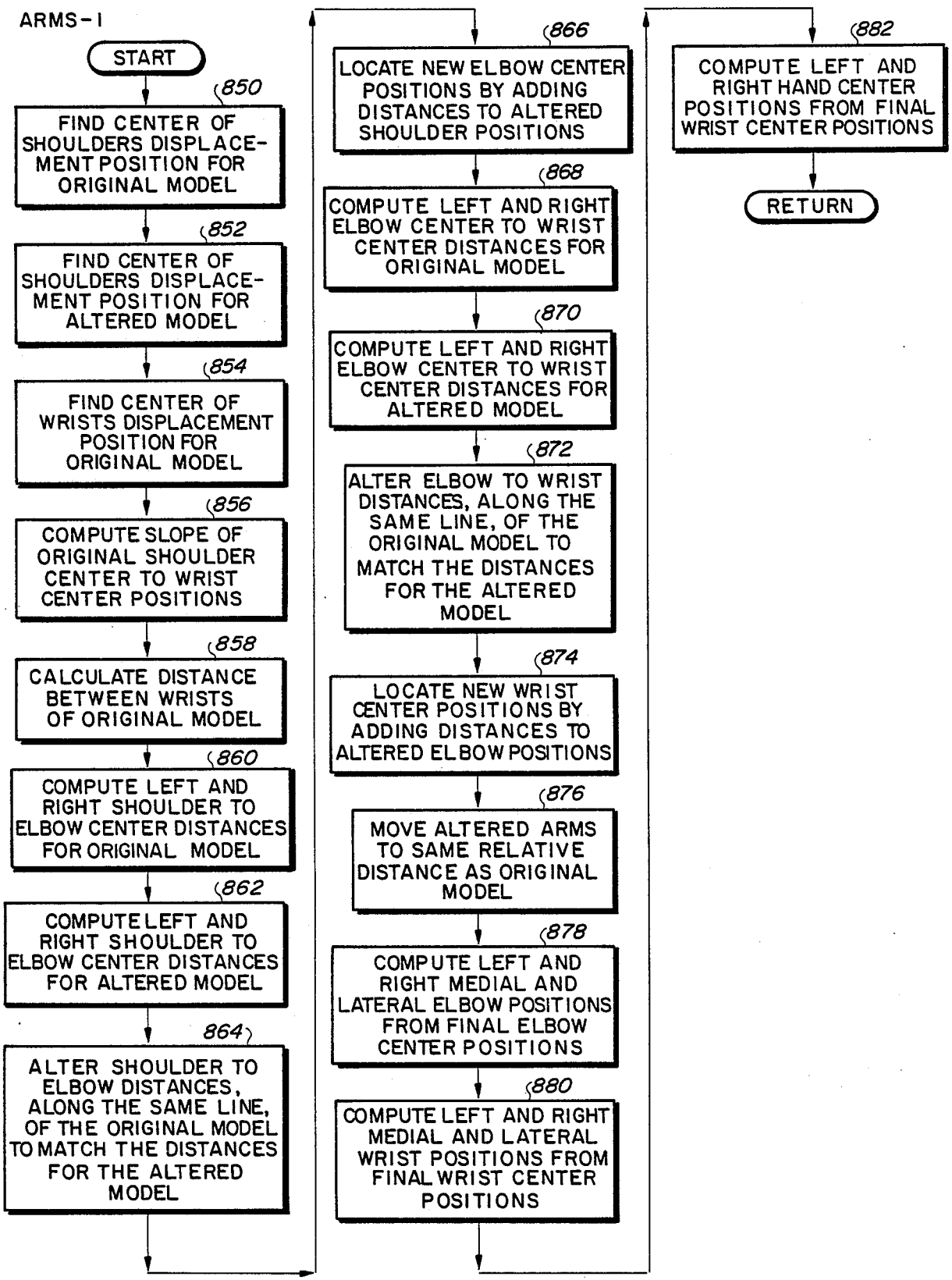

FIG. 12 is a detailed flow chart of the Arms-1 program for generating the arms position of a performer.

Figure 13:
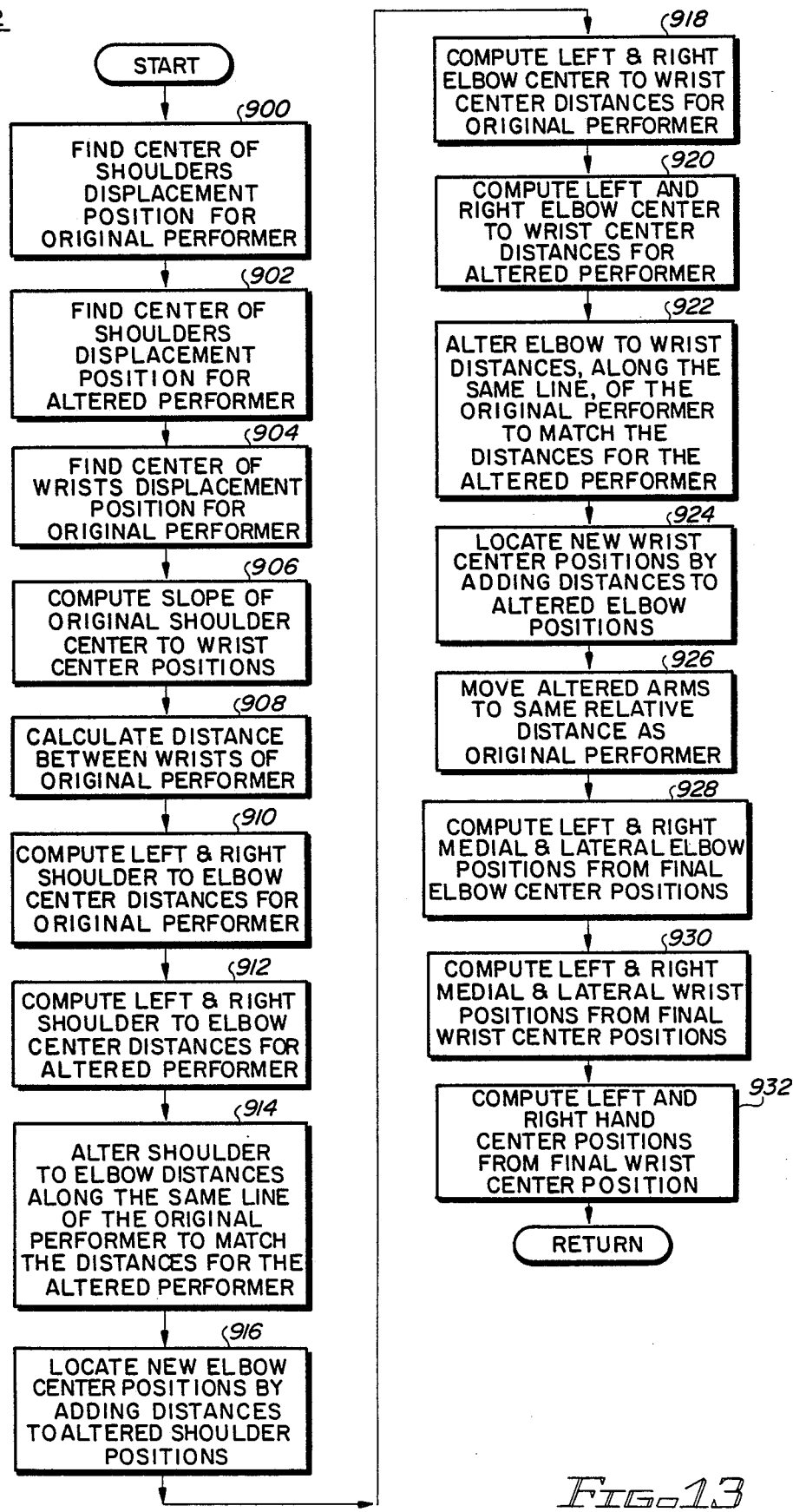

FIG. 13 is a detailed flowchart of the Arms-2 program for generating the arms position of a model.

Figure 14:
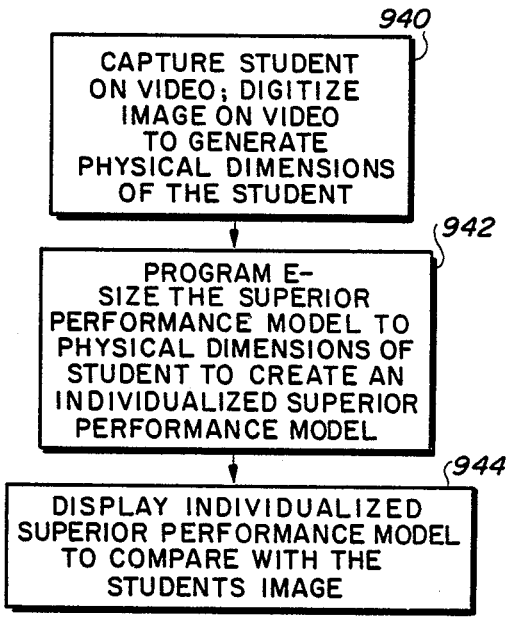

FIG. 14 is an overall flow diagram describing the process for generating an individualized superior performance model.

Figure 15:
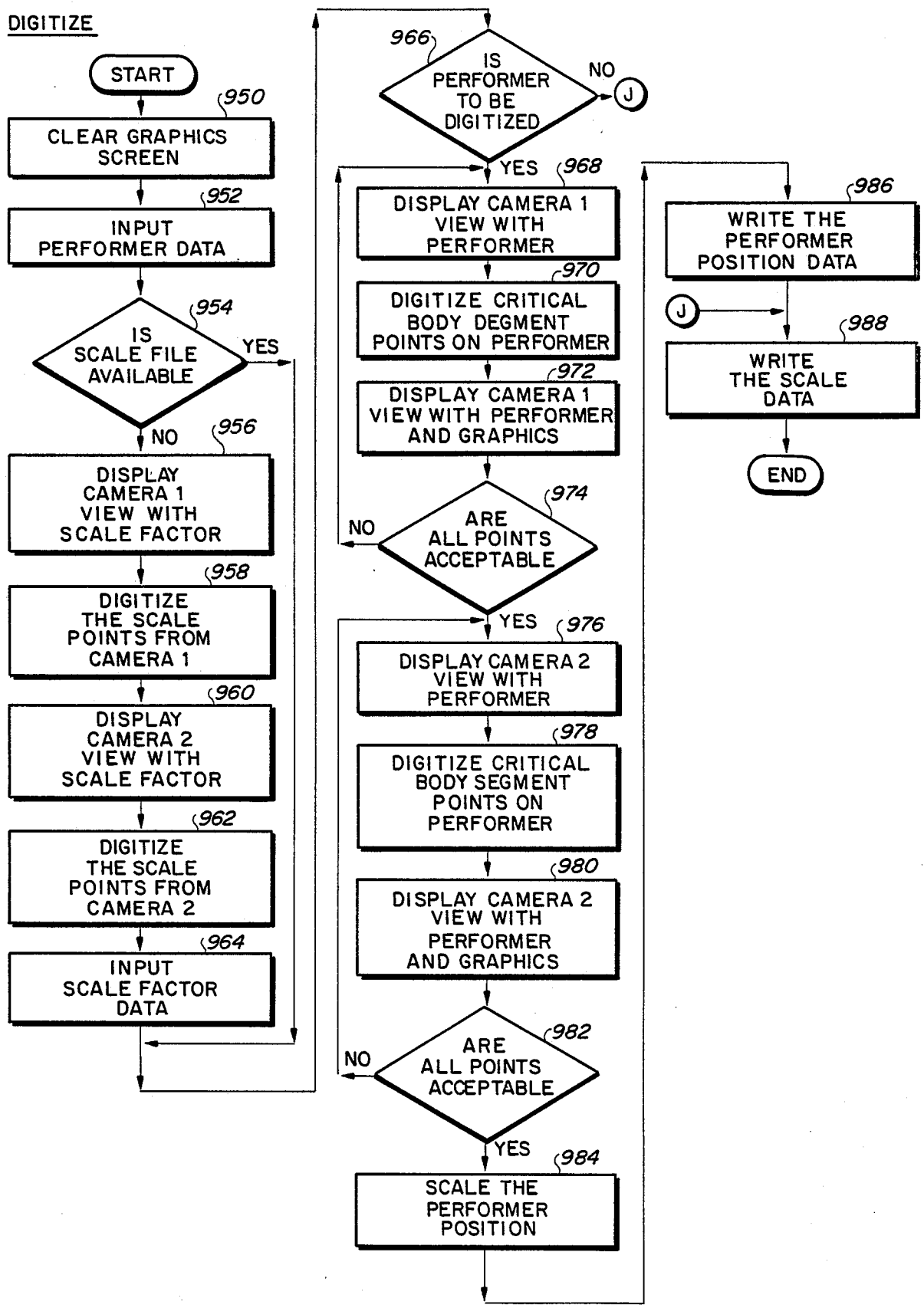

FIG. 15 is a detailed flowchart of the digitizing program for generating an individual performance model.

Figure 16:
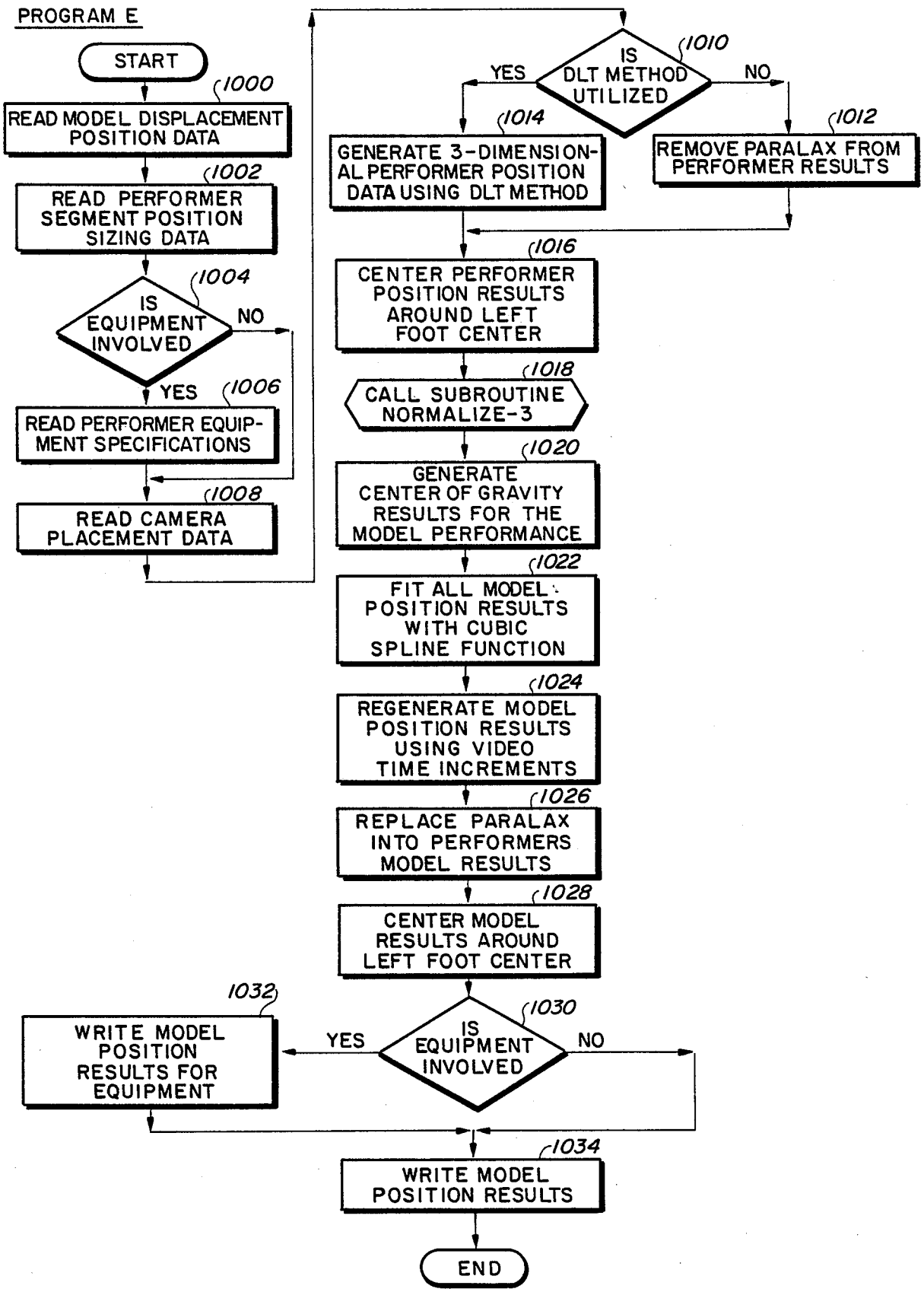

FIG. 16 is a detailed flowchart of Program E for the process of generating an individual performance model.

Figure 17A:
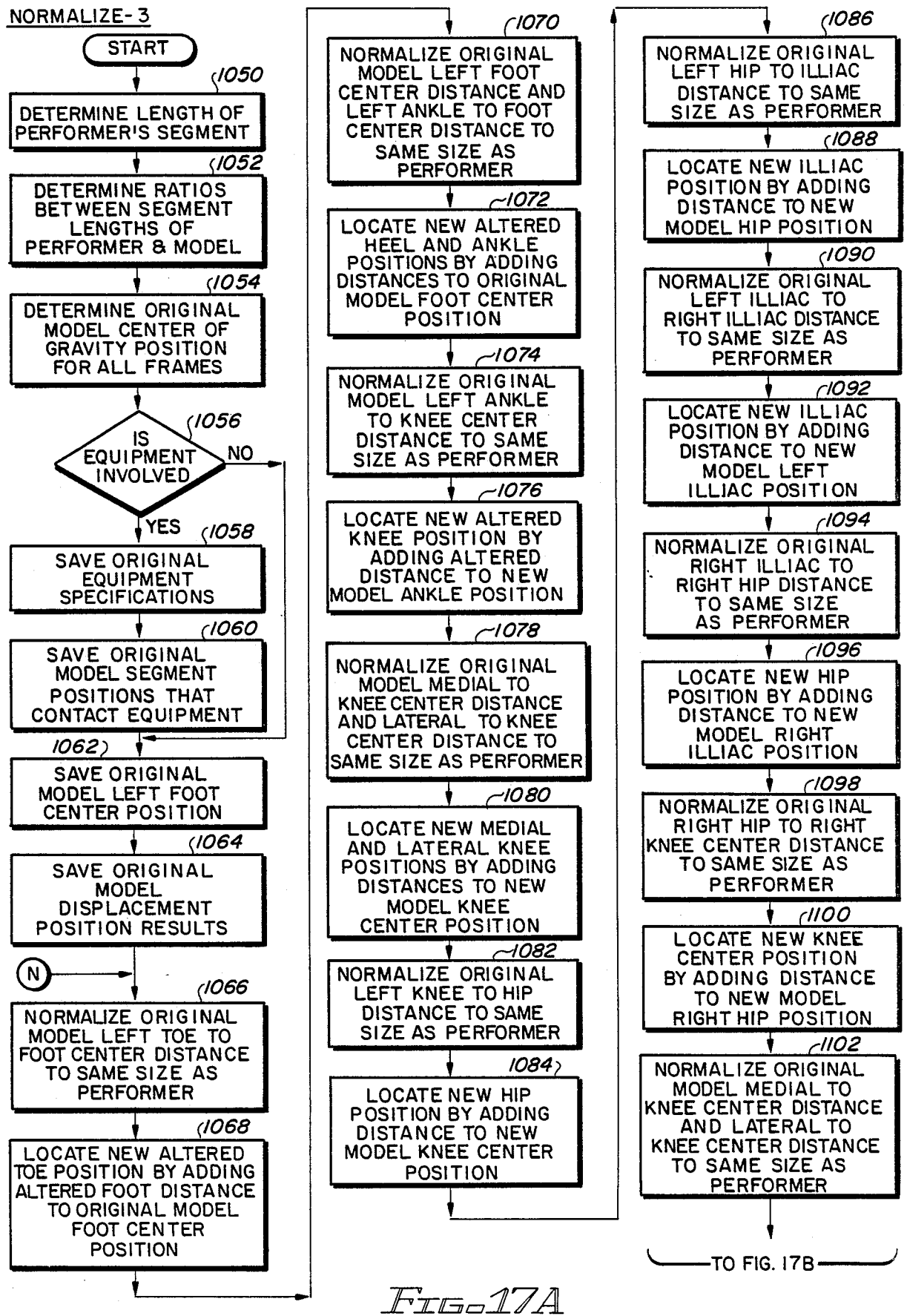

FIGS. 17A–B is a detailed flowchart for Normalize-3 routine used by Program E.

Figure 18B:
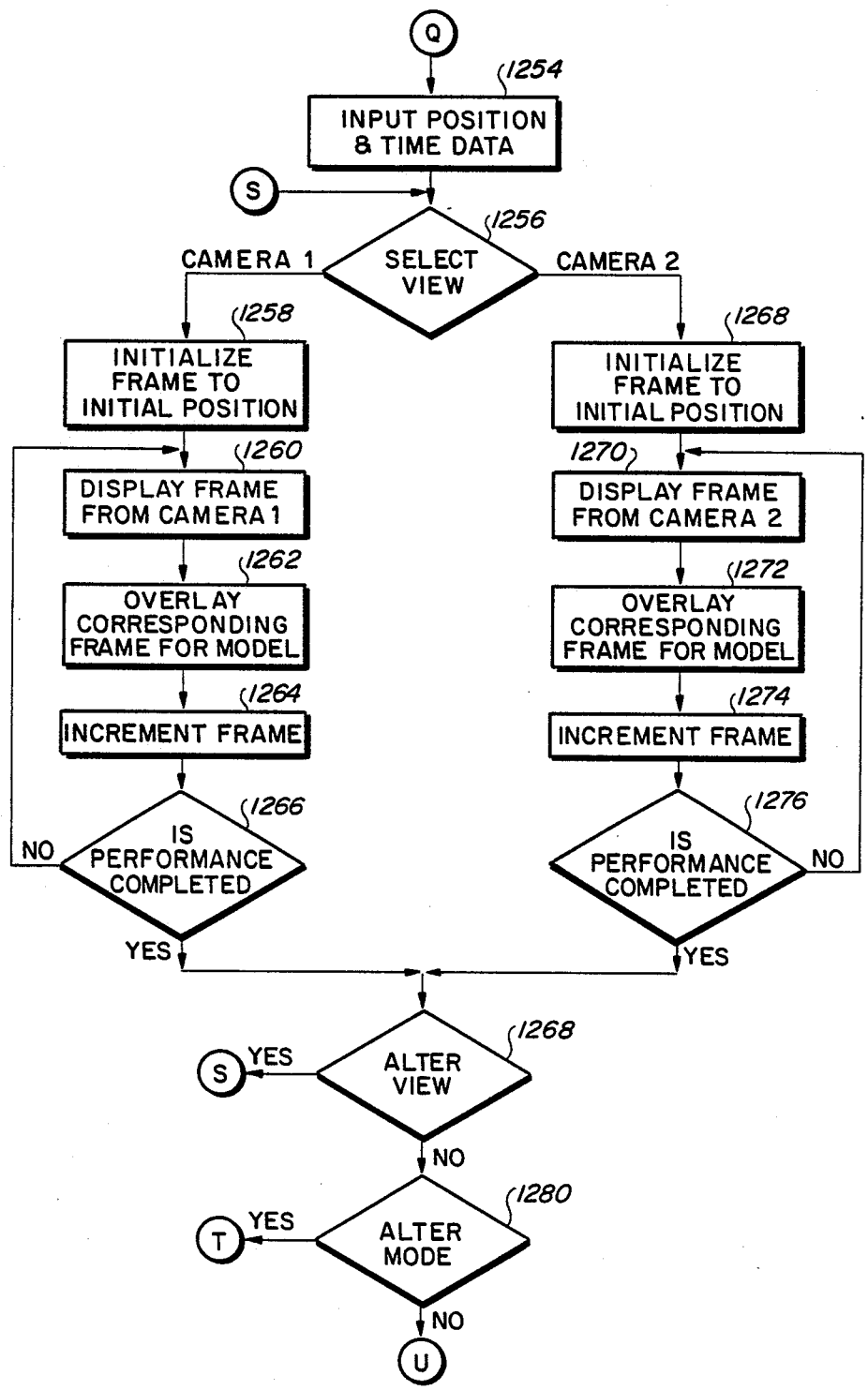
Figure 19A:
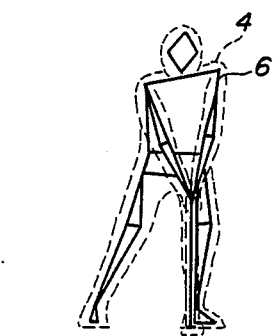
Figure 19D:
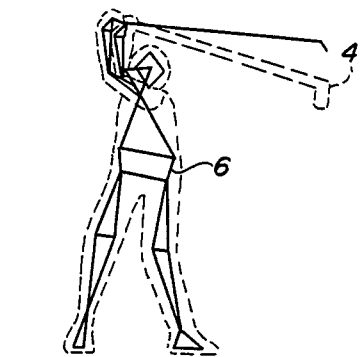
Figure 19H:
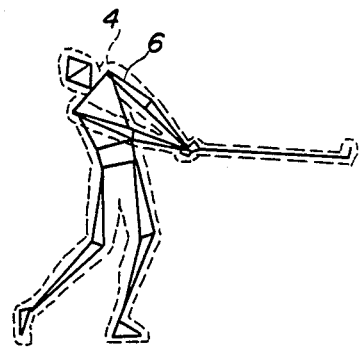
Figure 19B:
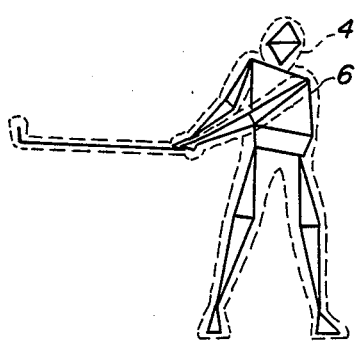
Figure 19E:
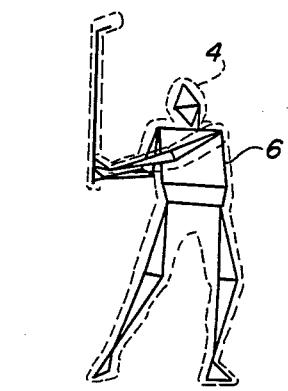
Figure 19I:
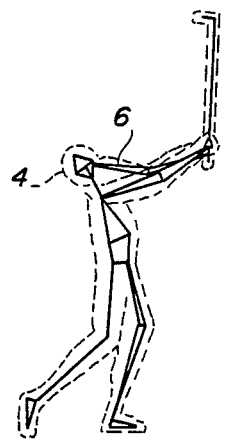
Figure 19F:
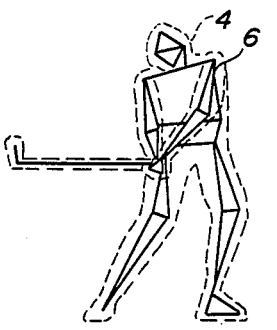
Figure 19C:
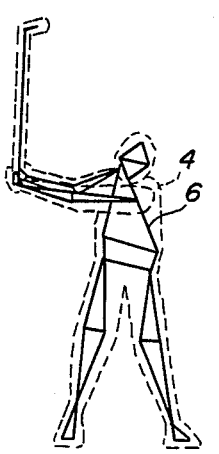
Figure 19G:
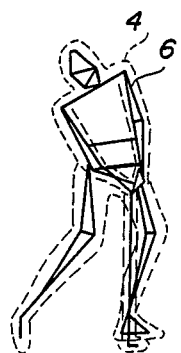
Figure 19J:
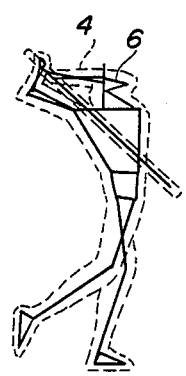

FIGS. 18A–C is a program for displaying the individual performance model.

FIGS. 19A–J illustrates the operation of the system in the on-line teaching mode and video performance mode.

DETAILED DESCRIPTION OF AN ILLUSTRATIVE EMBODIMENT

A. General Description

With reference to the drawings in general, there is illustrated a system and method in one form of the invention of projecting on to a video display, a first moving picture of the action of a student representative of the student endeavoring to accomplish the skill. A second moving picture is projected simultaneously on the same video display of the action of a computer generated superior performance model accomplishing the same skill. With the aid of a teacher, the student compares the action of the model to the person, whereupon the student's movement are corrected to coincide with the model's movement.

While more broadly applicable, the computer generated model or superior performance model is produced from the average movement patterns of a plurality of elite performers. The model is further enhanced with statistical trends which tend to produce superior performance. The model is then sized to the exact physical dimensions of the student.

While the present invention is described hereinafter with particular reference to golf, it is to be understood at the outset that the description which follows it is contemplated that the system and methods in accordance with the present invention may be used to teach a student numerous other manual or physical skills. These include but are not limited to running, baseball pitching, baseball hitting, track and field events, and numerous other sports activities.

The teacher is usually a person having the skill to notice and correct the inabilities of a student in performing a manual skill. For instance, the teacher may be a teaching golf professional capable of examining a student's swing and correcting the swing for effecting a better performance by the student.

The term student refers to an individual designed to accomplish or improve his skills in performing a manual or physical task. The manual task includes many activities such as sports and games. The manual task may involve complex motions using a piece of equipment such as swinging a baseball bat or a golf club.

The term elite performer refers to a performer capable of superiorly performing the manual skill. A large number of elite performers are used for computing the movement patterns of the computer generated model. A large number of elite performers tend to eliminate the small number of poor movement patterns that each of the elite performers display, because of the small percentage of errors as well as the dispersion of errors. For instance in determining a superior golf model, a predetermined number of PGA golf professionals are used to determine the superior golf model. The applicant has found that fifty PGA golf professionals generate an acceptable elite model. For example, in the fifty PGA golf professionals included in the golf model, a large majority of the group demonstrate a proper hand pattern during the back swing. Thus, by accepting the mean as a typical trend for this movement, a large number of proper movement patterns will overshadow the few poor patterns.

A standardized performance model or elite model refers to a computer generated model determined from a predetermined number of elite performers. The elite model is generated from the movement patterns of each elite performer. The elite model is improved by comparing the movement patterns of the elite performers to each other as well those of less competent performers. This approach to the significant performance trends is significantly identified as well as the directions that the excellent elite performers are moving the trends to achieve superior results. A simple example is the trend for excellent golfers to produce higher club speed at ball impact as compared to less skilled golfers. A less evident example is a trend for excellent golfers to produce lower hand speeds at ball impact as compared to less skilled performers. Both of these trends are justified biomechanically but, more importantly these trends are built into the elite model. The end product is an elite model that has human limitations, but pushed to the limits of the best of all of the excellent performers in each movement pattern.

An individual performance model is the computer generated superior performance model built to the exact specifications of the student to which it is to be compared. This requirement becomes obvious when a five-foot eleven inch, 160-lb. golf model is compared to a five foot one inch, 240 lb. student. On the video, the elite model towers above while easily fitting inside the wide frame of the student, making any productive comparison impossible. Since the student cannot be physically altered to any large degree, the elite model is adapted to the exact specifications of the performer. This individual performance model includes maintaining the balance of the model and adapting any equipment so that the model can perform at the highest level possible given the less than perfect body type for the particular movement.

The system as described in FIGS. 1 through 19, includes generating the individual performance model, on-line teaching, and displaying a video performance overlay. The generation of the individual performance model begins with the input of the three-dimensional body positions of the individual or student. The image is supplied in this example by two video cameras 12 and 14 positioned to provide the necessary three coordinates of the student 8 such as height, width and depth for each body segment. Even though only two cameras are illustrated, any number of cameras can be used. The student stands in front of the cameras so that all body segments of the student 8 are visible. Each image is stored on video recorders 16 and 18 respectively for processing immediately or at a later time. Applicant has found that a minimum 29 segment skeletal structure provides an accurate representation of the performer's body. The segments include toe, heel, ankle, knee, hip, illiac, shoulder, elbow, wrist, hand, ears, nose and vertebral segments. Specific skills may require additional body segments or the addition of equipment identifiers.

When the individual performance model is built, video image data of the student 8 are input one recorder at a time into the video portion of a computer 20. To accomplish this, a composite video signal (NTSC or equivalent) is converted into primary color components of a computer-generated format (RGB) using a standard NTSC-RGB converter 22. The video image is placed on a computer monitor 24, allowing the portions of the body segments of the student 8 to be digitized on an image processor 34 using a pointer or cursor. The results are sent to a computer mass storage 36. When both views have been processed the individual performance model can then be computer generated by computer 20.

Once the individual performance model is generated, two teaching procedures can be used to teach the student the physical skill. The system can be used either as an on-line teaching tool or a video (hard copy) demonstration tool.

The on-line teaching procedure begins with the placement of the video cameras in the best position required for teaching. Only one camera is necessary but two or any number is possible. The cameras can be positioned anywhere since a display program in the computer can rotate the model results to any view. To allow an immediate comparison between the student's performance and the individual performance model the video from a select camera is converted to computer usable format and displayed on computer monitor 25 and monitor 24. The computer then recalls the individual model, produced previously and overlays the individual performance model on top of the student. Any other positions or movements of the individual model can be overlayed to demonstrate the similarities or differences in performance. In stationary positions, like set up or beginning positions in golf, the student or teacher can see the differences and make immediate changes. In positions that are reached while moving, the student can be placed in a stationary position to demonstrate the "feel" of the position. Feel in this respect, may be defined as the mental impression or picture of muscular movement. Also, the student can perform the activity while the teacher watches the computer monitor to determine whether the selected position is being reached. At any time, the video image can be switched to another view while the model switches to the proper position at the same time.

If a movement occurs too fast or the teaching session is to be saved, the results from the computer can be saved on tape. This involves converting the image back to video format (RGB to NTSC) and recording the image. The results are then immediately viewed, processed with the video performance overlay procedure or saved for later examination.

The on-line teaching procedure allows the normal teaching situation to exist, with the added advantage of immediate checks on meeting the goals of the lesson. In actual practice of this invention, this procedure is proven to be both effective and efficient.

The second procedure involves producing a hard copy of the performance of the student, with the individual performance model overlayed. This process begins with the video recording on one of the video recorders (16 or 18) of the student performing the activity. For instance in golf, the student will swing the club attempting to drive the ball. Each view is then separately converted to computer format (NTSC to RGB) and displayed on the computer monitor 24. Beginning from the start of the activity (or anywhere else), the tape is played back in slow motion, with the individual performance model overlayed on top while performing the same movements. Thus the model performs along with the student, making comparisons at any point in activity of a simple task.

To accomplish this task, the computer takes the individual performance model and matches the model positions with the same relative positions of the student. This is done by inputting the timing of the student's actions. The computer then matches the model timing to that of the student, overlaying the proper model positions, at the correct time, on top of the video record of the performance. To save the results, the computer video results are converted back to video format (RGB to NTSC) and recorded. Additional views of this performance, repeat application of video performance overlay application or other performances, or use of the on-line teaching application is possible.

B. HARDWARE DESCRIPTION

Figure 1:
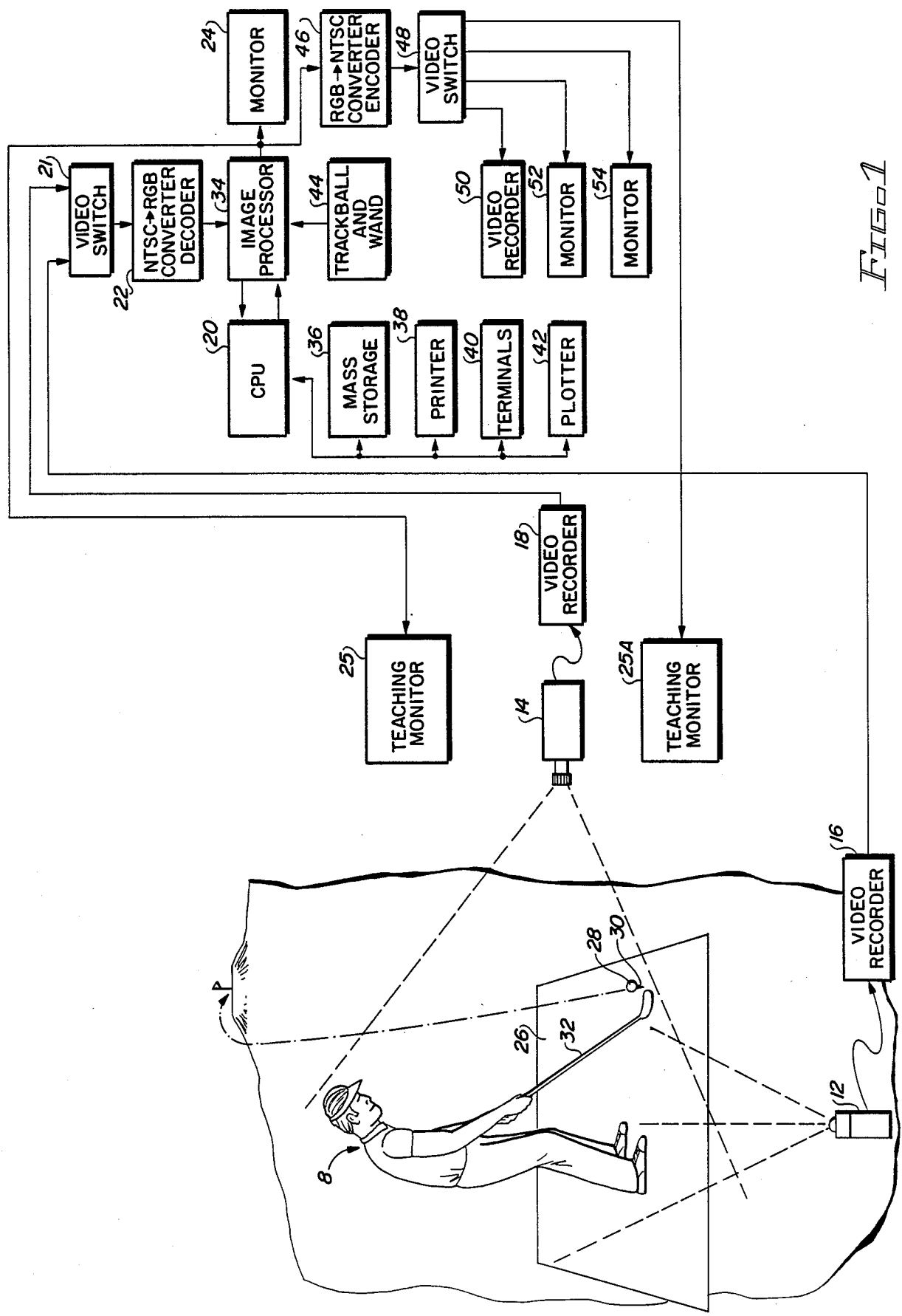
FIG. 1 illustrates the components of a teaching system of the present invention showing an example of the system used for teaching, golf.

More particularly and with specific reference to FIG. 1 there are shown components of a golf instruction system disposed in operative positions. The system includes a driving platform 26 for holding on a tee 30 a golf ball 28 positioned to be impacted by a student 8 holding a club 32. A video camera 14 records the front facing position of the student 8 as he stands on the driving platform 26. The camera 14 passes electrical pulses to video tape recorder 18 for recording front views of the student 8. Another video camera 12 records the side view of the student 8 as he stands on the driving platform 26. The camera 12 passes electrical pulses to video tape recorder 16 for recording side views of the golf student 8. Any number of cameras can be used, however, applicant has found that two cameras are sufficient to properly analyze a golf swing.

To digitize the three-dimensional body positions of the student 8 requires two video cameras positioned to provide the necessary three coordinates of height, width and depth. One camera may be used if the student assumes two stance positions one after the other. Once the resulting body/segments of the student 8 are digitized by using a pointer on image processor 34 only one camera is needed for on-line teaching or video performance overlay. The single camera can be positioned for any view desired by the teacher and student to view teaching monitor 32 or monitor 25.

The video cameras used in the practice of this invention are solid state shuttered video cameras for avoiding the problem of standard tube type video cameras which have a long exposure time. Previous tube type video cameras produce a picture blur for any rapid movement of the student 8. The rapid movement produced by the golf swing requires a video camera that can capture the high speed motion on video tape without the blur problem found in typical video cameras. Preferably, the video cameras capture 60 images per second of the golfer in motion. Additionally, the video cameras used preferably do not exhibit the lag characteristics of tube type video cameras. The video cameras used in the practice of this invention are colored, shuttered video cameras model SVC-09 manufactured by the XIBION Electronic Corporation. The solid state video cameras are shuttered to provide at least 1/500 second exposure time in a manner well known in the art. The outputs from shuttered video camera 12 and 14 are fed respectively to video recorders 16 and 18.

The outputs from video recorders 16 and 18 are fed to a video switch 32 having a plurality of inputs so that either video output can be applied to the input of a decoder 22. Video switch 32 switches between the front view of the student 8 or the side view of student 8. Video switch 32 is eliminated if only one camera is available, however, the single camera must be positioned for a front view and then repositioned for a side view if both views are desired. The decoder means 22 is a NTSC to RGB converter. In the practice of this invention, applicant has found that a model PCD-463 Chroma decoder manufactured by the Lenco, Company provides the necessary conversion from the NTSC video signal to the RGB input for image processor 34. The output from decoder 22 is applied to an input of image processor 34. Image processor 34 combines the video image from decoder 22 and the computer generated model from computer 20 and displays the result on monitor 24 and monitor 25. The image processor 34 found principally in FIG. 1 may illustratively take the form of a model GMR-270 series image processor manufactured by the Grinnell Corporation.

The image processor interfaces with a trackball unit 44. The trackball unit 44 provides the necessary input commands for moving a cursor to digitize an image on monitor 24. The image processor 34 includes the software necessary for manipulating the image data, digitizing an image, and displaying the image in a manner well known in the art. The trackball unit 44 may be also replaced with a keyboard, or wand, or a computer mouse for digitizing purposes in a manner well known in the art.

Computer 20 includes the necessary hardware and logic including memory for manipulation of the data to determine a computer generated model. The computer system includes a mass storage media 36, a printer 38 for output, terminals 40 and plotter 42. The computer utilized by the applicants in the practice of this invention is a model VAX 11/750, manufactured by Digital Equipment Corporation. Accordingly, the programs written for the practice of this invention are in a language suitable for that computer.

As readily apparent to any person skilled in the art, other programmable general purpose computers of similar capability can be substituted for the VAX 11/750. Also, other languages may be used in such other machines for the programs. The programs set forth herein are in a machine code language from FORTRAN programs written for the VAX 11/750. This is a Digital Equipment Corporation language utilized for all of the VAX model computers.

There are, basically, twelve programs used by applicant in the practice of this invention. These are programs that digitize a performer generate the elite model, generate the individual performance model, and display the results on the video monitors. In addition, various types of programs were supplied by Digital Equipment Corporation, Grinnell Corporation, and IMSL, Inc. with the purchased hardware. These later programs are executive systems, diagnostics, utilities, monitoring display programs, statistical programs and higher level programs available and will not be described herein. The model generation programs are set forth in the appendix enclosed listed in object code, and are explained in flow charts contained in FIGS. 5 through 18. In order to use the programs provided, it is only necessary that the appended codes be assembled and run on a similar system.

The computer 20 supplies image processor 34 the necessary data for the image processor 34 to generate a video image of a model. The image processor combines the input from decoder 22 and computer 20 and generates a display on monitor 24 and monitor 25. The generated display includes the video image of the student 8 with an individualized superior performance model overlayed on the student's image. The output from image processor 34 is also applied to the input of an RGB to NTSC converter 46. In the practice of this invention, applicants utilize a model CCE-850 color encoder manufactured by the Lenco Inc. The output from encoder 46 is applied to video switch 48. Video switch 48 applies the input individually or simultaneously to a plurality of outputs. Typically, an output will be applied to an input of a teaching monitor 32 located near the student 8 such that the student 8 can easily watch the results of his swing. In addition, the outputs from video switch can be applied to a video recorder 50, an additional monitor 52 and another monitor 54.

C. Operation

Figure 2:
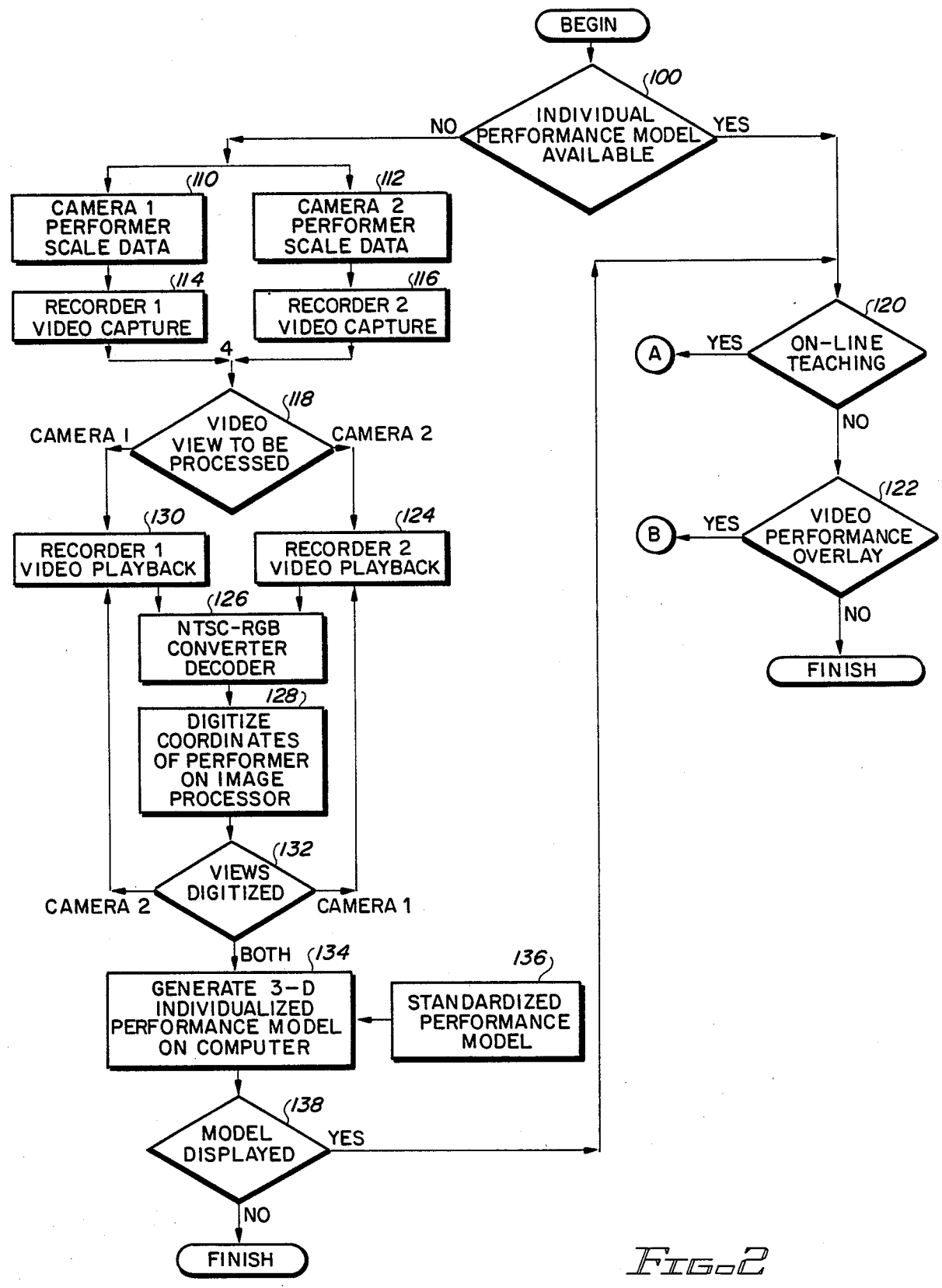
FIG. 2 is a overall flowchart describing the operation of the system in either a on-line teaching mode or a video overlay mode.

Broadly considered, FIG. 2 illustrates a general flow diagram of operating the teaching system for teaching a student to accomplish a physical skill. The basic overall process includes generating the individual performance model, teaching the student on-line, and overlaying the individual performance model onto the image of the student. Referring to FIG. 2, in block 100 it is determined whether the individual performance model is available. Before on-line teaching or a video performance overlay process can be undertaken, the individual performance model must be available for the student involved. Briefly, the individual performance model is a superior performance model scaled to the student's individual body portions. If an individual performance model is available on-line teaching can begin or video performance overlay can be accomplished as shown in blocks 120 and 122.

If the individual performance model is not available it must be generated from the standardized performance model. It is important to note that if an elite performer is to be added to the superior performance model he too must follow the following process to have his movement patterns digitized. For purposes of clarity, since the process of digitizing the movement patterns of an individual are the same for an elite performer as that of a student the following description refers only to that of a student. However, it is important to point out that the same procedure is done for an elite performer.

The process begins with the input of the three dimensional body positions of the student. The image is supplied by two video cameras positioned to provide the necessary three coordinates of height, width and depth. All that is required is for the individual to briefly stand in front of the cameras so that all body segments are visible and can be scaled, block 110 and block 112. Each image is stored on a video recorder for processing immediately or at a later time, block 114 and 116. Note that for a student the act of performing the manual skill is not required. This process is interested in digitizing the body portions of the individual for which an individual performance model is to be generated. However, for an elite performer the entire performance must be digitized.

Both views of the student are simultaneously recorded on the video recorders. In block 118, one of the video views is selected to be processed. If the second camera's view is selected, the second recorder is played back through the decoder into the image processor, blocks 124, 126 and 128. If the first camera view is selected the first recorder and put in the playback mode and the video is played back through the decoder to the image processor, blocks 130, 126 and 128. Using the digitizing capabilities of the image processor in the computer, the body and equipment positions of the student are digitized and stored for computer processing. Note that for an elite performer all the video frames showing the activity of accomplishing the skill are digitized. The digitized information includes displacement data consisting of the movement patterns of all of the body points of interest from the hand to the foot and including any equipment that is being used.

Briefly, the digitizing process employs either a direct linear transformation method or a 90° camera offset method. For a better understanding of the digitized method described briefly above, attention is directed to FIG. 6 and FIG. 15 of the drawings where the digitized method is illustrated in detail.

If only one view has been digitized the remaining view is processed, block 132. In this manner, a three-dimensional digitized pattern of the student is obtained. In digitizing each elite performer, displacement data of the body position versus time are obtained. After the view has been digitized a three-dimensional individual performance model is generated in block 134. The individual performance model is computed from the superior performance model, block 136. The superior performance model is a product of a number of movement patterns from elite performers. The superior performance model also includes trends of superior performance. The individual performance model is developed from the superior performance model by altering the superior performance model to match the exact body dimensions of the individual. In addition, all movement alterations the individual must produce due to differences between the individual's body segments and those of the superior performance model are accounted for and included in the individual performance model. For better understanding of the generation of the individual performance model described briefly above, attention is directed to FIGS. 15 through 18 of the drawings wherein the generation of the individual performance model is described in detail. If it is desired, the model can be displayed, block 138. After the individual performance model is generated, on-line teaching or video performance overlay can begin.

The basis of all individual performance model is the superior performance model. This model is a compilation of the performances of a large number of excellent performers in the movement to be modeled. This model is built using modeling methods that identify the critical movement patterns of the performers as a group producing a final mode that is superior to any of the performers used to produce the model. The critical patterns are different in different movements, for instance a golf swing is different than sprinting, but the procedure used to identify the critical patterns remains the same. An example of identifying a critical movement is the computer examination of the sprints of the lead sprinters like Carl Lewis, Evelyn Ashford, Calvin Smith, etc., which indicate that upper leg position at full flexion is greater than sprinters of lesser quality. This trend is incorporated into the movement patterns of the superior performance model. Moreover, this trend is advanced to the limit of the best performers in the particular movement to be modeled. Thus, unless one elite performer is dominant in every movement pattern (which has never occurred), the superior performance model is superior to all performers used for generating the model.

As is clearly indicated, every activity has different criteria for its success, resulting in the need for model development in every case. Obviously, the successful movement patterns for golf are not the same for running. Fortunately, the modeling approach producing the superior performance model can be used in every situation as long as the major criteria of the activity are identified in a group of the elite performances. Thus, in sprinting, with the major criterion being maximum forward speed, with the movement patterns of the top 20 lead sprinters the computer identifies the trends the lead performers are using to produce this criteria. Similarly, assuming the major criterion in golf is to maximize the distance while controlling the direction of the ball, the computer uses the same process to identify the trends in the movement patterns of the fifty PGA players for achieving the critical criteria for golf.

A major strength of the modeling approach is that within each activity, the superior performance model is altered according to a specialized interest. Thus, if maximum ball distance is the only criteria of interest in golf, a standard performance model to maximize distance can be generated by simply making this the only factor for success.

D. On-Line Teaching Process

Broadly considered, the on-line teaching process allows a student to compare the student's position or movements with the individual performance model overlayed for demonstrating the similarity or differences in performance. The on-line teaching is used in stationary positions, for instance, the setup or beginning position in golf, where the teacher can identify the differences between the individualized performance model and the student and make immediate changes. In positions that are reached while moving, the student can be placed in a stationary position to demonstrate the feel of the position or the student can perform the activity while the teacher watches the monitor to determine whether the selected position is being reached. At any time the video image generated at the teaching site can be switched to another view with the individualized performance model switching to the correct position at the same time.

The on-line teaching process allows a normal teaching situation to exist between a teacher and a student. An added advantage is immediate checks on meeting the goals of the lesson. If a movement occurs too fast or a teaching session is to be saved, the video results from the computer can be saved on tape.

Referring to FIG. 3 there is shown a flow diagram of the on-line teaching process. The on-line teaching process begins with the placement of the video cameras in the best position required for teaching. The number of cameras is normally two but any number is possible. The cameras can be placed anywhere since the display program in the computer can rotate the individualized performance model results to any view. For the illustrative embodiment two cameras are shown placed in a position for displaying the view in which the teacher wishes to emphasize the skill, blocks 150 and 152. In golf, these views are usually a front view and a side view.

To allow an immediate comparison between the student's performance and the individual performance model, the video from a selected camera is converted to a computer usable format through an NTSC to RGB decoder, blocks 154 and 156. Using the image processing and overlay capabilities of the computer the selected individual model position required for teaching purposes is overlayed on the student's image, block 158. The individual model position is determined from the superior performance model produced at an earlier time individualized to the student's exact body dimensions, block 160. The processed view is processed through a RGB to NTSC encoder to alter the computer usable format to a video format, block 162. The teaching session is recorded on a video recorder and displayed on-line to a monitor located at the teaching site blocks 164, 166 and 168. If an additional view or position is required using the on-line teaching procedure the process is repeated from the beginning by selecting a video view to be processed, block 170. After the on-line teaching process is complete, it is determined whether the video performance overlay process is to be used, block 180.

The on-line teaching process has proven to be both effective and efficient in teaching a student a physical skill. In particular, applicants have found that a student golfer improved significantly by using the on-line teaching process coupled with instructions from a teacher such as a PGA golf professional to enhance and improve his golf game.

E. Video Overlay Performance Process

This process involves producing a hard copy video record of the performance of the student as the student normally would try to accomplish this skill with the model overlay. For instance, in golf, this process involves video recording the normal swing of a student as he accomplishes to drive the ball at a target. The individual superior performance model is overlayed on the student for the student to compare his swing to the model swing.

The process begins with video recording of the student performing the activity. For instance, in golf, when the student swings normally to drive the ball. Each view is then separately converted to computer format through the NTSC to RGB encoder and displayed on the computer screen. Referring to FIG. 4 two sets of cameras are positioned to record the student as he normally swings, blocks 200 and 202. In blocks 204 and 206, the video from each respective camera is captured on a video recorder. The video view to be processed is determined, block 218. If camera two is selected, recorder two is put in the video playback mode to playback the video through the NTSC-RGB encoder to the image processor, blocks 220 and 222. If camera one is selected, the video view from camera one is played back from recorder one through the NTSC-RGB encoder to the image processor, blocks 224 and 222. Beginning from the start of the activity or anywhere else, the video tape is played back in slow motion with the individual performance model overlayed on the student's image while performing the same movement. Thus the model performs along with the individual making comparisons at any point in the activity a simple task, blocks 226 and 228.

To accomplish this process, the computer takes the individual performance model and matches the model positions with the same relative positions of the performer. This is done by matching the individual performance model to key positions of the student's performance. The computer matches the model timing to that of the performer by overlaying the proper model positions at the correct time, on top of the video record of the student's performance. For instance, in golf, applicant has determined a number of key positions for matching the student's performance to the individual performance model positions. These ten key positions, related to club position, are the address which starts the swing, the club horizontal back swing, the club vertical back swing, the top of swing, the club vertical down swing, the club horizontal down swing, the impact, the club horizontal through swing, the club vertical through swing, and the finish.

Referring briefly to FIG. 19 there is shown an individual performance model 6 overlayed on the student's image 4 performing a normal golf swing. At each of the 10 key positions the model's position is adjusted to coincide with the student's position. Thus, when the student reaches the second key position, the club horizontal back swing position, the model is adjusted to this key position. Note that a key position can be easily identified in the student's swing and the model is easily adjusted to this position. This continues through the rest of the ten key positions. Thus the model is forced to coincide with the 10 key positions in the student's swing that can be easily identified. This results in the individual's performance model being exactly timed to the student's swing.

Note that the student could swing very slowly through the 10 key positions which would cause the image to correspondingly swing slow with the student. However, the student in the video performance overlay process is encouraged to swing normally to drive the ball to a target. Swinging slowly by the student may improve his form but in reality the ball will not travel as far. Thus, in the video performance overlay the image of the student is video taped as the student normally swings to achieve maximum distance and direction in his golf swing. Although the positions of the student and model correspond to the key positions, it should be noted that all video positions between key positions are displayed.

To save the final results the computer video result is converted back to video format through the RGB-NTSC encoder, block 230. The results can either be displayed on a monitor display 232 or a recorder 234 to capture the results of the student's swing. If a second view from another camera, such as the side view, is required, another view is processed in the same manner as the first view, block 236. After the video performance overlay process, the student can proceed to on-line teaching process or is finished with his lesson, blocks 238 and 240. As is obvious, the video tape may be saved and shown to other participants of the sport. For instance, if a video overlay performance is made of an exceptional elite performer, such as Jack Nicklaus, the performance can be viewed by other students for aiding them in improving their golf swing. In addition, the video overlay performance of the swing of an exceptional performer is saved for later analysis by experts in other interested fields, such as golf and biomechanics. Also the video performance overly made of a performer during peak performance can aid in the rehabilitating of a performer trying to recover from an injury. These and other advantages of the present invention will become apparent by referring to the following detailed description and accompanying drawings.

F. Software

Broadly considered, FIGS. 5 through 18 are flow diagrams describing the process of processing an elite performer's performance, generating a superior performance model, determining an individual performance model, and displaying the results in a form appropriate for teaching purposes. The flow diagrams described the operation of the programs included in the appendix.

1. Procedure to generate superior performance model

Figure 5:
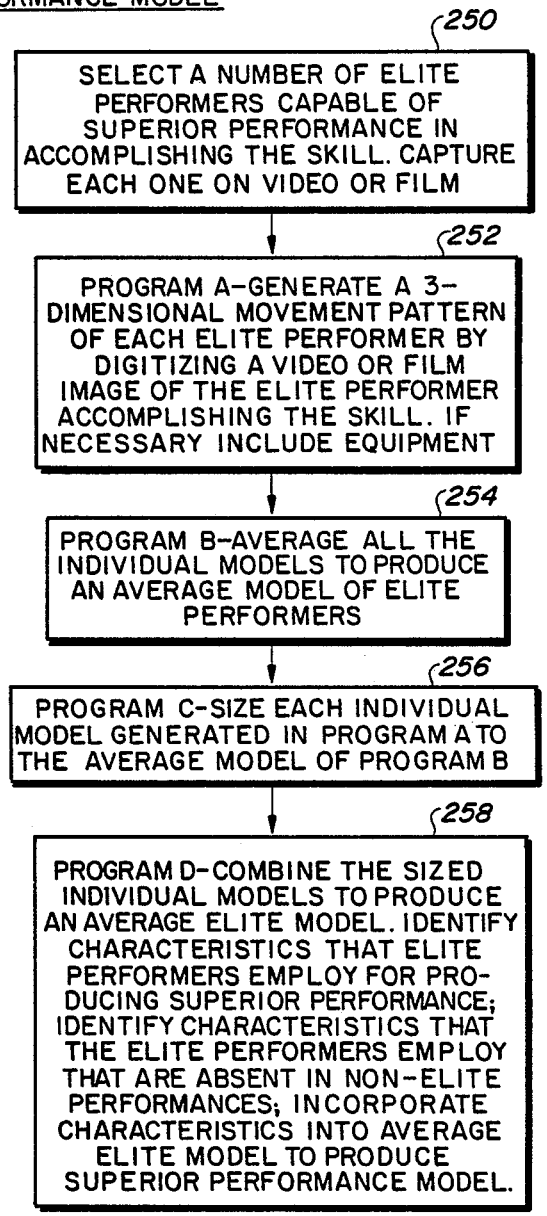
FIG. 5 is an overall flowchart describing the process for generating the superior performance model.

Referring to FIG. 5 there is shown the process to generate a superior performance model from a predetermined number of elite performers. Basically, a number of elite performers capable of superior performance in accomplishing the skill or activity to be learned is captured on video tape on film, block 250.

For instance, in golf, the elite performers may include the top money earners on the professional golf association tour. Another example is in sprinting, where the elite performers may be chosen from those with the best time in sprinting. The process to generate the superior performance model includes four programs labeled Program A through Program D. Each program reads data from a file or appropriate mass media input on a computer and generates a file with the output being used by the next program. The data are formatted into the computer and are contained in files which each file representative of an elite performer data. A second file contains the file names for the elite performer's data. By reading the second file the computer recognizes the number of elite performers for generating the superior performance model.

In Program A, a three dimensional movement pattern for each elite performer is processed. The three dimensional movement pattern is generated by digitizing a video or film image of the elite performer accomplishing the skill. For instance, a video or film image is made of each PGA golfer as he swings the club. If the activity includes equipment, the equipment segments are included in the digitizing process. This program generates an individual model for each elite performer that is captured on the video tape or film. The output is written to a mass storage file on the computer, block 252.

Program B uses the output files of Program A and averages all of the individual models generated in Program A to produce an average model of elite performers. Thus, the average model includes the average movement pattern of each elite performer accomplishing the skill. Program B outputs a data file including the average model data, block 254.

Program C reads the average model data from the output file of Program B and sizes each individual model generated in Program A to the average model of Program B. For instance, if the average model of Program B has a height of 5 ft. 11 inches, Program C will size each individual model of each elite performer to a height of 5 ft. 11 inches. For instance, if Jack Nicklaus' model is 5 ft. 10 inches in Program A, Program C sizes his model to 5 ft. 11 inches.

Program C produces an output file containing the sized elite model data, block 256. Program D combines the sized individual models to produce an average elite model. The average elite model is the movement patterns of the sized individual models of Program A.

Program D then identifies characteristics that elite performers employ for producing superior performance. For example, to drive a golf ball farther, it has been found that the elite performers increased the club head speed for producing a superior drive. Second, Program D identifies characteristics or trends that elite performers employ that are absent in non-elite performances. These trends or characteristics are produced by examining numerous non-elite performers and comparing them to the average elite model. Thus as the number of non-elite performers use the system, more trends can be identified and included in the final model results. The identified characteristics are then incorporated into the average model to produce a superior performance model. For example, it has been found that elite golfers, while increasing the club head speed, actually reduced the hand speed at impact. This trend is incorporated into the average elite model for producing a superior performance model. The superior performance model is used to compare a student's physical skill to the results of a superior performance model's activity, block 258.

a. Program A

Figure 6:
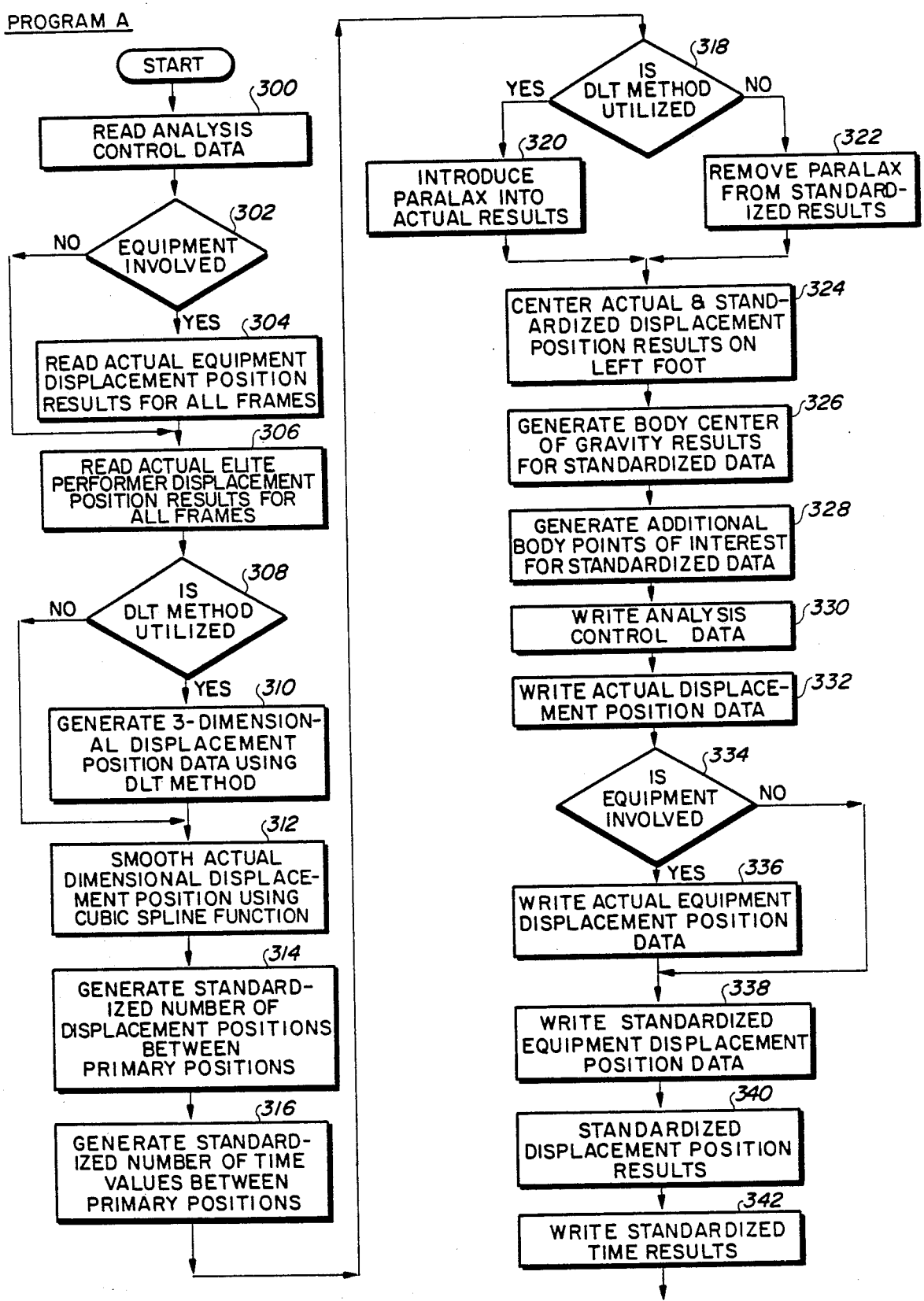
FIG. 6 is a detailed flowchart of Program A for generating a superior performance model.

Program A begins the process of generating a superior performance model by taking the three-dimensional movement patterns of a group of elite performers in the activity that is to be modeled. For instance, in golf, fifty of the top PGA golf professionals are used for generating the elite model. Referring to FIG. 6, the control data for the program is read into the computer, block 300. This data include all information necessary for processing the elite performance results. This includes scale data, video frames of actual data, time between frames, frames wanted in standardized results, key positions of interest, camera position data, smoothing levels, and equipment data. The next step is to determine whether the activity involves any equipment, block 302. Typically, a golfer uses a golf club, but in other sports and activities, equipment is not involved, such as in running. If equipment is involved, the actual equipment displacement positions must be determined for all frames, block 304. If no equipment is involved the displacement positions for the equipment is not required. A displacement position is simply where the item is located in space.

The displacement position information is digitized off a video or film using standard digitizing techniques that are well known in the art of biomechanics. All displacement position data are located from either high speed film or video of the performer using a digitizer. Points of interest are located frame by frame and stored in the computer memory. This displacement information includes the movement patterns of all of the body points of interest from the hand through the upper body including the head through the hips and lower body to the foot, including any equipment that is required. The points used for identifying body structure typically include twenty-nine body joints or landmarks, including left and right hand (third metacarple)), wrist (medial and lateral), elbow (medial and lateral), shoulder, illiac, hip, knee (medial and lateral), ankle, heel, toe, ears, and nose. In specialized cases, additional points of interest may be added.

The next step is to actually read the displacement position results for all frames for the elite performer, block 306. There are basically two very well known methods of digitizing three-dimensional displacement information. The direct linear transformation (DLT method) and the 90-degree camera offset method.

The first direct linear transformation (DLT) method is well known in the art of biomechanics and preferred due to the precision of the results. When the DLT method is used, the results must be processed to produce the results in three dimensions. There are instances, however, when the DLT method can not be feasibly used, block 308. In these cases, a 90° camera offset method is employed. When the 90° camera offset method is used, the cameras are located to view the principal axes One camera views the height and width, while the second camera, offset 90°, views the height and depth. Using the height as the common factor between both the cameras the three dimensional coordinates of a point can be easily determined. If the DLT method is utilized then the three dimensional displacement position data is computed, block 310. The DLT method is a direct linear transformation method of solving the collinearity condition of photogrammetry. By using stereo pairs of cameras, and inputting the coordinates of a number of known points in the field of view, a series of equations can be generated for identifying the actual (non-paralax) three dimensional coordinates of any point in the field of view. In addition, this process corrects for constant film deformation and lens distortion. Regardless of the method used to obtain the coordinates, after the three-dimensional displacement data are computed, the results are smoothed, using a cubic spine function, a method well known in the art of biomechanics. All smoothing is performed by fitting a cubic spine function to the actual data, then regenerating the data at the required smoothing levels. The cubic spine function is generated using IMSL software manufactured by IMSL, Inc., block 312. Basically, then the displacement positions are digitized, smoothed and regenerated for achieving a continuous smooth activity by the elite performer.

The next step is to generate a predetermined or standardized number of displacement positions between primary key positions identified for each activity, block 314. For instance, in golf there are 10 key positions (shown in FIG. 19). If a movement pattern being studied takes five seconds or a tenth of a second, information is collected anywhere from between 50 to 1,000 frames depending upon the actual movement activity. This step standardizes the number of information frames so that every performer has the same number of information frames. For instance, in golf, it takes approximately two seconds for a golfer to swing a golf club. At 500 frames per second, the swing generates 1,000 frames of information. The process requires a specific number of frames for every performer. One performer may take 1,100 frames to swing, while another performer may take 800 frames. The number of frames need to be standardized so that the movement patterns can be later combined. In this step, an exact number of frames is generated for each particular movement under study. For instance, in golf, 180 positions or frames are chosen for each performer. Thus the 1,000 frames required for one golfer to swing are standardized to 180 positions. Since there are 10 key positions identified in golf, the program generates 20 positions between each key position. This corresponds to a total of 180 positions for a golfer's swing.

After generating a standard number of displacement positions between primary positions the process generates a standard number of time values between primary positions, block 316. These time values correspond to the time a performer has reached a primary position based upon when the performer reaches a predetermined position. In other words, if the predetermined position is the impact of the ball all time values will be generated using the impact of the ball as the origin. Thus the horizontal down swing may occur 0.25 seconds before impact or the vertical down swing may occur 0.5 seconds before impact. The positions between the key positions will be assigned an equal interval of time. For instance, if it takes 0.25 seconds to go from club vertical downswing to club horizontal downswing, the ten positions between will have a differential time of 0.025 seconds. Once the differential time is computed, it is very easy to compute an absolute time for each position. In this manner, the timing of the activity may be properly analyzed.

Since the actual results are to be displayed on video, the paralax must be included in the results. Since the DLT method removes paralax, it must be replaced using the camera position data inputted as control data. Therefore, the process must determine if the DLT method is used, block 318. If the DLT method is used, paralax is introduced into the actual video results, block 320. Since paralax is not wanted in the standardized results used to generate a model, these results are not altered, block 322. Since the 90° camera offset method includes paralax, it must be removed from the standard results. Since paralax is wanted in the actual results, these results need not be altered, block 322.

The next step is to center the actual and standard displacement position results on a predetermined body segment. Note that an origin of axes is chosen which will be common to both the model and performer. In golf, the origin of axes is the center of the left foot. However, some sports do not lend themselves to a fixed origin, such as running. In this case, a repeatable feature of the activity is chosen. For instance in running, the toe hitting the ground is the origin of axes, since this is repeated every step cycle.

The next step is to generate the body center of gravity results for the standardized data, block 326. The center of gravity data are very important since the horizontal components of the center of gravity of the person must remain the same if balance is to be maintained. When the individual performance model is generated by sizing the superior performance model to the size of the performer, the center of gravity must be adjusted on the individual performance model. Basically, any time sizing takes place in the program, the center of gravity of the model has to be adjusted to coincide with the previous model. The body center of gravity results are calculated by the segmental movement procedure using Dempster's body parameter data as explained in W. T. Dempster, Space Requirements of a Seated Operator, W.A.D.C. Technical Report, Wright-Patterson Airforce Base, Ohio, 1955. For instance, suppose the trunk of the model has to be shortened. Shortening the trunk places the center of gravity towards the rear which causes the model to sit back on his heels. The center of gravity is changed by tilting the body slightly to bring the center of gravity back to the original position.

The next step is to generate additional body points of interest for standardized data, block 328. The additional points of interest may include the center of head, center of shoulders, center of hips, etc. The process finishes by writing the appropriate data onto a file for later processing by other programs. The data written to the files are the control data, the actual displacement position data, any equipment displacement data, the standardized equipment displacement position data, the standardized displacement position results, and the time results, blocks 330-342.

b. Program B

Figure 7:
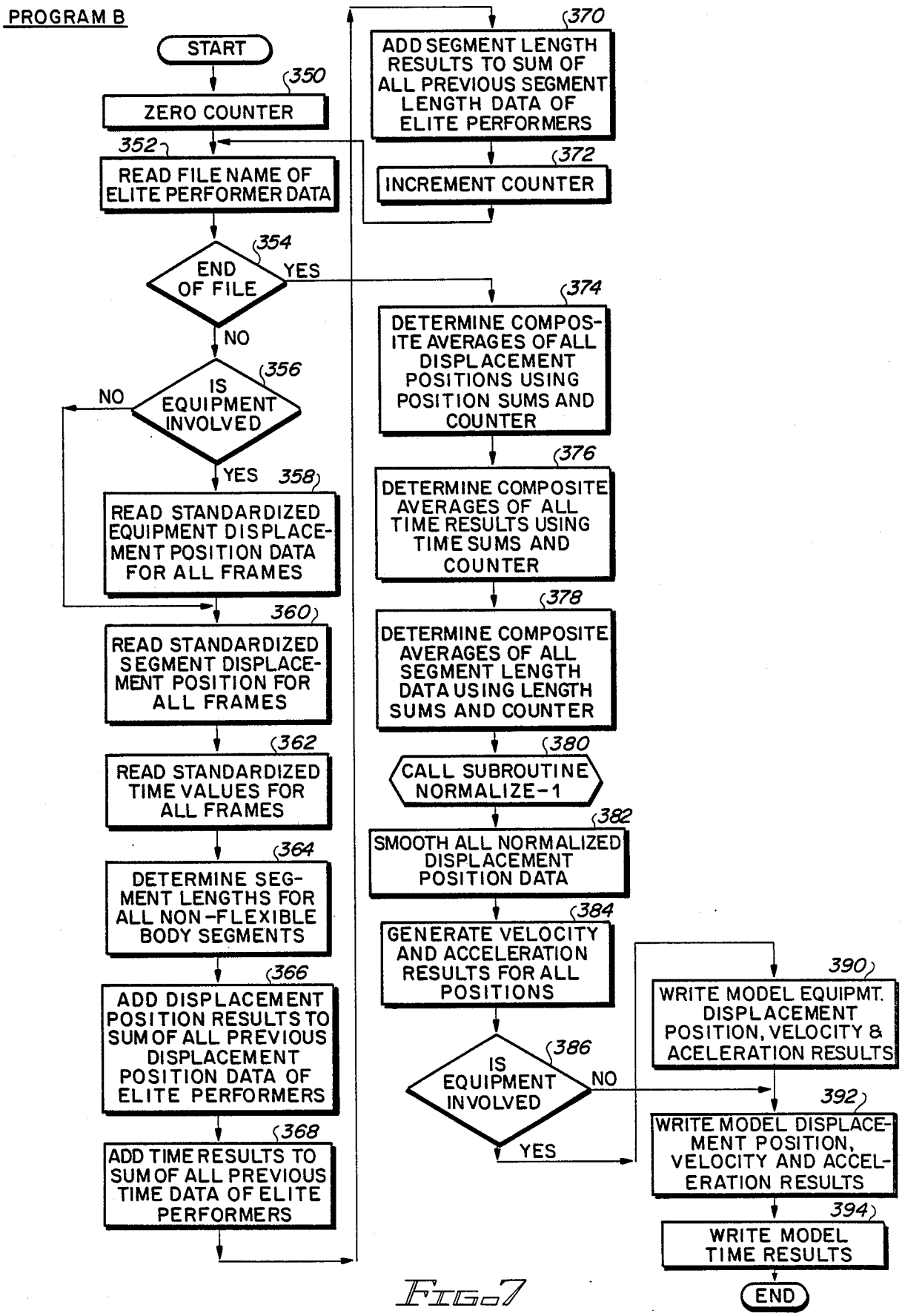
FIG. 7 is a detailed flowchart of Program B for generating a superior performance model.

Referring to FIG. 7, program B inputs the standardized displacement results of the elite performers from Program A and determines the average movement patterns for the activity. Basically, Program B averages all the standardized movement patterns generated from Program A for generating a standardized average model of all of the elite performers.

To begin the process, a counter is zeroed for determining the number of elite performers which will be averaged together to form the standardized average model, block 350. In block 352, a control file is read having the file names for each elite performer data file, block 352. When an end of file is reached in the control file, this signifies that all the elite performance data have been processed and the average of the data can be determined, block 354. For each activity it must be determined whether equipment is involved, block 356. If equipment is involved, the standardized equipment displacement position data are read in for all frames, block 358. If the activity does not involve equipment this step is bypassed. Next the standardized segment displacement position for all frames for an elite performer is read from the elite performer data file by the computer, block 360. Next the standardized time values for all frames are read, block 362. Proceeding, the segment lengths for all non-flexible body segments are determined, block 364. To minimize error, the average segment lengths of the performer of the entire activity is assumed to be the actual length of those segments that remain constant in length. However, the trunk and head are considered flexible in size. The displacement position results are then added to the sum of all previous displacement position data of previous elite performers processed, block 366. The time results are added to the summation of all previous time data previously processed, block 368. The segment length results are added to all previous segment length results of elite performers previously processed, block 370. The counter is incremented by one to signify that the data from one elite performer has been processed, block 372. The process then loops back to block 352 for processing the data of another elite performer. Eventually the data for all the elite performers will be processed and the process will determine the averages of the summed data.

The first average determined is the composite averages of all the displacement positions using the data summed from the elite performer's data, block 374. Next the composite average for all the timed results are calculated, block 376. Finally, all of the averages of the segment length data are computed, block 378. Basically at this point, the averages of all the displacement positions, time results and segment lengths are determined. The process then invokes another process called normalize-1, block 380. Basically, the normalized process normalizes the model displacement position data to match the average body segment size of the model itself. Thus, the model performances are altered only to correct segment size errors between the individual frames and the average segment size. For better understanding of the normalize-1 process routine described briefly above, attention is directed to FIG. 10A-C of the drawings wherein the normalizing process is illustrated in greater detail.

After normalizing all the displacement position data the normalized displacement position data are smoothed, block 382. To smooth the normalized data for generating velocity and acceleration results a cubic spline function is fit to the displacement position data. Next the velocity and acceleration results are determined for all positions, block 384. Since the displacement positions are known and the time values are known the velocity and acceleration are easily determined. Since the displacement data are fit to a cubic spline function, the first derivative of the cubic spline function is the velocity, and the second derivative is the acceleration.

The process then finishes by writing the results of the calculations to a file for further processing. If equipment is involved, the equipment displacement position velocity and accelerations are written out, blocks 386 and 390. Next the average model displacement position, velocity, acceleration, results, are written into a file, block 392. Finally, the model time results are written to a file, block 394.

c. Program C

Program C takes the standardized displacement results of each elite performer generated in Program A and alters the size of the elite performer to match the size of the average model generated from Program B. Thus, if 50 elite performers are used to generate a superior performance model, the superior displacement results generated by Program A are sized to the average model generated from Program B. For example, if the standard golf model is 5 ft. 11 inches, all the standardized displacement results of the elite performers from Program A are sized to the height of 5 ft. 11 inches.

Figure 8:
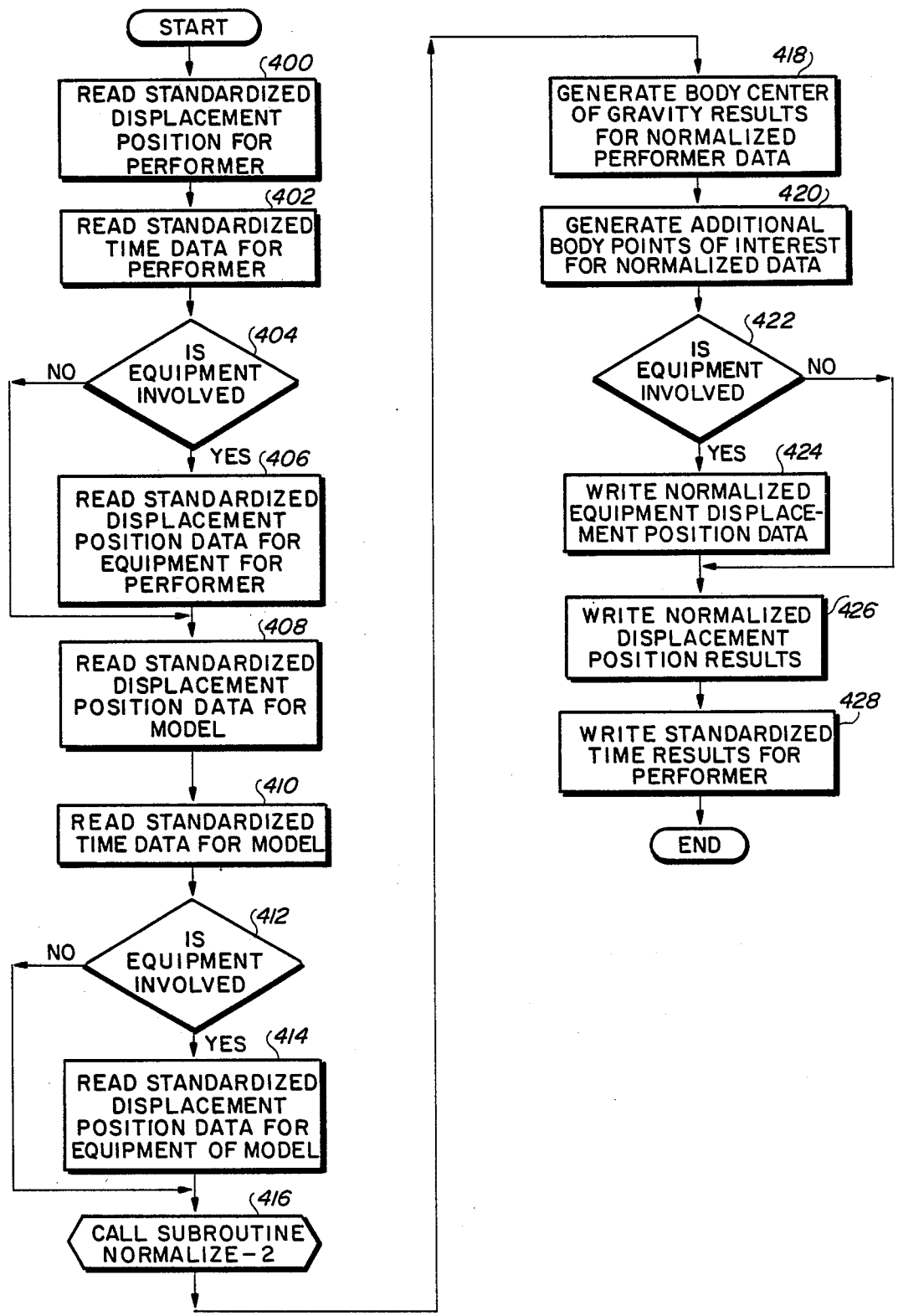
FIG. 8 is a detailed flowchart of Program C used for generating a superior performance model.

Referring to FIG. 8, the process begins by reading in the standard displacement position data for each performer generated by Program A, block 400. Next, the standardized time data for each elite performer generated from Program A is read, block 402. If equipment is used in this activity such as a golf club, then the standardized displacement position data for the equipment of each elite performer is read, blocks 404 and 406. Next the standardized displacement position data for the average model generated by Program B is read, block 408. Proceeding, the standardized time data for the average model is read, block 410. If any equipment is involved the standardized displacement data for the average model is read, blocks 412 and 414.

The process then normalizes the displacement position data on each performer and the model by involving another process called Normalize-2, block 416. Briefly, the normalize-2 routine normalizes the performer displacement position data to match the body size of the model. By sizing the performer displacement position data to the model displacement position data this program uses the elite performance as the model and standardizes the segment lengths of the performer throughout the performance, using the standardized segment length as length guidelines. This standardizes the elite performance to the size of the model, without altering the performance except to accommodate size alteration. Basically, the subroutine normalizes the data for each elite performer to the average model. For a better understanding of the Normalize-2 routine reference is made to FIG. 11A-C, wherein a detailed flowchart of the routine is illustrated.

Next the center of gravity results for the normalized performer data are calculated as previously described, block 418. Additional body points of interest are generated from the normalized data, block 420. This may include the center of head, center of shoulders, center of hips, etc. If any equipment is involved the normalized equipment displacement position is written to a file for further processing, blocks 422 and 424. Next the normalized displacement position results are written to an appropriate file, block 426 and the standardized time results for each performer is written to a file, block 428. Now that all of the elite performer models are the same size, the next step is to combine all the normalized performer models for generting an elite performance model.

d. Program D

Program D takes the standardized (to key positions) and normalized (to size) displacement results of the elite performers from Program C and determines the elite movement patterns for the activity. It then takes those significant characteristic trends that the elite performers employ to produce superior performance and incorporates them into the final model results. The final model results is the superior performance model. Program D is very similar to Program B which computes an average model. The beginning of Program D averages the results from Program C of the standardized elite performer models and averages the standardized elite performance models to compute an average elite performer model.

Figure 9A:
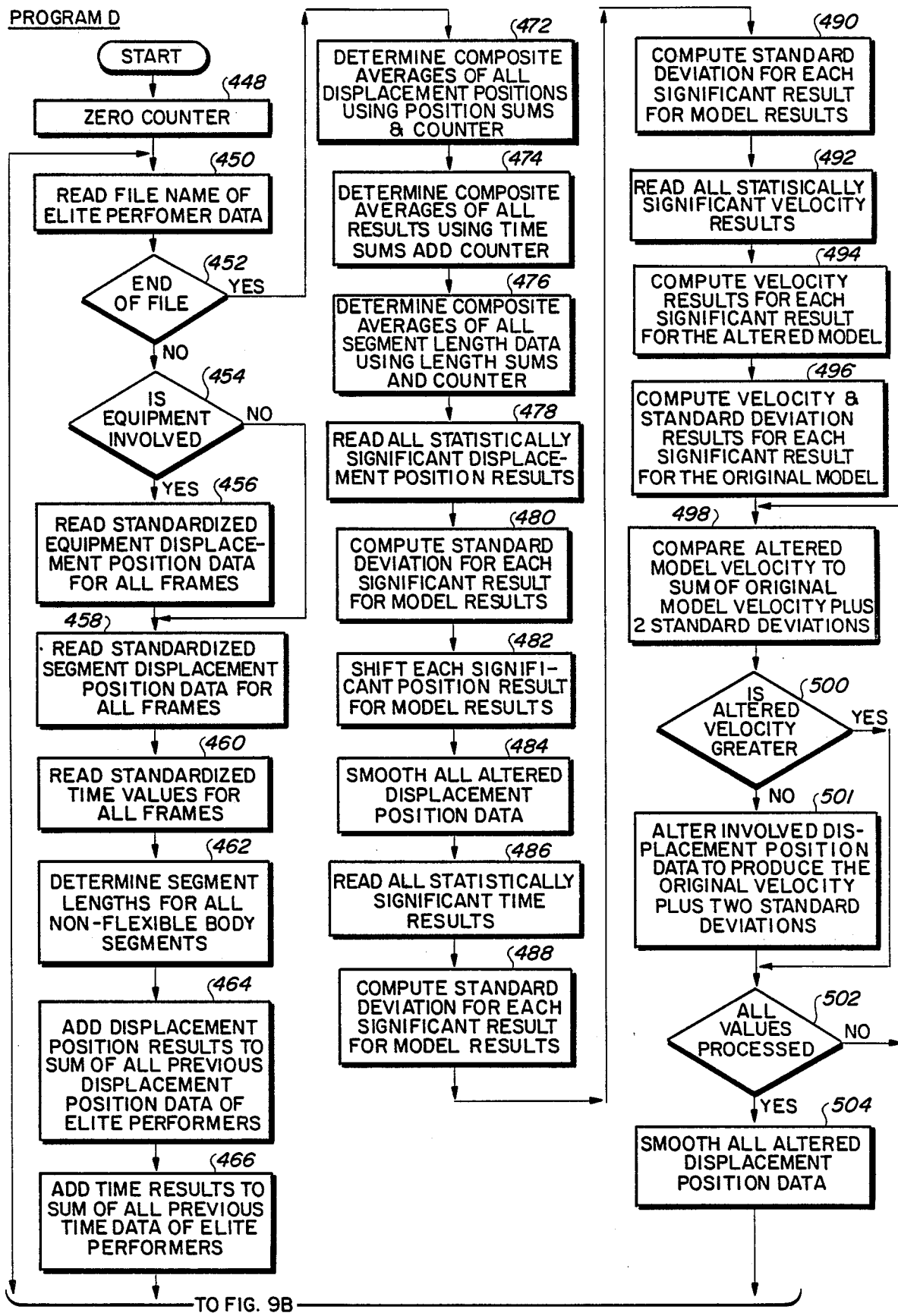

Referring to FIGS. 9A-B to begin, a counter is used for determining total number of elite performers used to compute an average. This counter is zeroed initially, block 448. A control file contains the file names of all the data for the standardized elite performance models. Reading the file name causes the computer to open up that file which contains the standard elite performer model data, block 450. If the end of the file containing the names of all of the standardized elite performer data is read, this signifies that all the data to be averaged has been processed and the averaging procedure can begin, block 452.

The program begins by reading in the data from the first file. The data contain the standardized elite performer model data generated from Program C for the first elite performer. If any equipment is involved, the standardized equipment displacement data is read in for all frames, blocks 454 and 456. Similarly the standardized segment displacement position for all frames and the standardized time values for all frames is read in for each performer filed, blocks 458 and 460. Next the segment lengths for all non-flexible body segments are determined, block 462. The displacement position results are added to the previous displacement position data previously read, block 464. The time results are added to the previous time data of all standardized elite performer model data as previously read, block 466. The segment length results are summed to the previous segment length data, block 468. In block 470, the counter is incremented by one to signify that one elite performer model has been processed. The process continues again at block 450 by reading the file name for the next standardized elite performer data file. If the end of the control file is read, this signifies that all the standardized elite performance data has been read and that the averaging process can begin, block 472. The first average determined is the displacement position of all the standardized elite performer models, block 472.

Next the average time results are calculated, block 474. And finally the average of the segment length data are computed, block 476. Basically at this point, the average performance model for all the standardized elite performance models are determined. The next step is to identify performance trends of superior performance and incorporate these superior performance trends in the average standardized performance model.

Significant trends are identified by using standard comparative statistics in two ways. First, within group comparisons. That is, significant trends dictating success that are identified within the elite performers group are flagged and included in the average standardized performance model. For instance, in golf, a significant within group trend identified is that farther distance is generated in driving a golf ball by generating faster club head velocity at impact.

The second way of identifying significant trends is between group comparisons using critical performance criterion selected for the activity between elite performers and non-elite performers. For instance, in golf, a significant between group trend identified is that further distance is generated in driving a golf ball by producing lower hand velocity at impact. From both sources, significant trends for displacement positions are read by the computer system, block 478. The standard deviation for each significant trend for model results is computed, block 480. The significant position result is shifted by two standard deviations for generating a superior performance, block 482.

The program then smooths all the altered displacement position data using a cubic spline smoothing process with the altered results given a lower smoothing level than the unaltered results, block 484. All altered patterns are smoothed and shifted toward the altered results. Next statistically significant trends in the time are read, block 486. Similar to the displacement position, the time results' standard deviation for each significant trend for the model results are computed, block 488. The time value of the model is shifted two standard deviations in the direction of superior performance, block 490.

Next the statistically significant trends for the velocity are read, block 492. The velocity results for each significant trend for the altered model are computed, block 494. Although altering the displacement position and time results should account for all required changes in the model, a check is made using the velocity results. Significant velocity results identified in the same manner as the position and time results are compared to the corresponding velocity values of the altered model, block 498. In those instances where the model results do not equal or exceed two standard deviations above the original model, the involved displacement positions are altered to produce the required results, blocks 500 and 501. If all of the values are not processed the procedure begins again at block 498 by comparing the altered model velocity to the sum of the original model velocity and two standard deviations. If all the values are processed, the procedure proceeds to smooth all of the altered displacement position data, blocks 502 and 504. Using a cubic spline smoothing process, with the altered results giving a low smoothing level then the unaltered results, all altered displacement position patterns are smoothed and shifted towards the altered results, block 504.

Next displacement position and segment length data are passed to the normalize-1 routine for normalizing the displacement position and segment length, block 506. For detailed description of the Normalize-1 routine reference is made to FIG. 10A-C. Next the normalized data is smoothed for generating velocity and acceleration results, by using a cubic spline function fit to the displacement position data, blocks 508 and 510. The result is a superior performance model that reflects the pattern movements of all elite performers and has been modified by significant trends which are identified in the direction of superior performance. The superior performance model is then stored in data files, blocks 512 through 518.

e. Normalize-1 Program

This program normalizes the model displacement position data to match the average body segment size of the model itself. Thus, the model performance is altered only to correct segment size errors between the individual frames and the average segment size.

Referring to FIG. 10A-C, the model displacement position data are placed into the performance displacement position data. This standardizes the segment length of the model throughout the performance, using the standardized model segment length as the length guidelines. This eliminates most of the digitizing error that produces small changes in segment lengths that should remain constant, block 550. Next the original model center of gravity position for all frames is determined, block 552. If any equipment is involved in the activity the original equipment specifications are saved, blocks 554 and 556. Also the original model segment position that contact the equipment are saved, block 558. For instance, the hand position segments which hold the golf club are saved. Next the original model left foot center position is saved, block 560. The left foot center is used as the origin point for all displacement measurements for golf. Thus, the final model is repositioned at the same foot position as the original model. Next the original model displacement position results are saved, block 562. Since the original model positions are needed to build a new model, they are saved so they can be recalled after the results are altered. Next the segment length of the original model for the current frame are calculated, block 564. The ratios between segment lengths of frame and average segment length of each performer are determined, block 566. The standard performer segment length results are passed to this routine. This ratio standardizes the model segment length to those of the performer. Next the head and trunk ratio segment lengths are set to 1, block 568. Since the segment lengths of the head and trunk can change due to the flexible vertebral column these lengths are not forced to a standardized length. In this routine, any length alteration is assumed to be due to vertebral flexibility and thus the head and trunk length are left untouched.

The original model's left toe to foot center distance is normalized to the same size as the performer, block 570. Beginning from the left foot center origin, the distance from the origin to the toe for the model is altered to equal the same distance from the center to the toe on the performer. This is done by multiplying the segment ratio determined in block 566 and the model length for this distance. Next, the new altered toe position is located by adding the altered left toe to foot distance to the original model foot center position, block 572. In this manner, the left foot center remains the same for the altered model. Next, the original model left heel to foot center distance and left ankle to foot center distance are normalized to the same size as the performer, block 574. The new altered heel and ankle positions are located by adding the distances found in block 574 to the original model foot center position, block 576. The process continues by normalizing the original model left ankle to knee center distance to the same size as the performer, block 578. The new altered knee position is located by adding the distance of block 578 to the new model ankle position, block 580. For all remaining segment length changes, the same procedure is used as in the toe, heel, and ankle. The exception is that, except for the left foot center, all remaining segments are built around the altered results. Thus the new ankle to knee distance is added to the new ankle position to produce the complete altered model segment position, blocks 580 through 616.

Due to small errors, the right foot vertical position may be slightly shifted from the original model vertical position. Thus the new model is forced to the original vertical position for the toe, heel and ankle, block 618. The small vertical error is divided equally between the contributing leg segments (left and right upper and lower legs), block 620.

To eliminate any final small errors, the new model results are recentered around the left foot center, block 622. Next the horizontal and lateral body center of gravity offsets are set to zero, block 624. The original model illiac center to shoulder center distance is normalized to the same size as the performer, block 626. The new center shoulder position is located by adding the distance of block 626 to the new model illiac centered position, block 628. The new center position of the illiac hips, right knee and left knee are located from all altered lower body results, block 630. The center point distances between the feet (foot center), and the shoulder, illiac, hip, and knee are generated, block 632.

The process then determines whether the horizontal and lateral body center of gravity differences between the original and altered models are less than a predetermined distance, such as 0.005 inches. The process is an iterative process. First, the horizontal and lateral body center of gravity differences are computed by shifting the centers determined in block 632 by the product of the center of gravity offset, (which is initially at zero), center to foot center distance, and the ratio of the center to foot center distance and shoulder center to foot center distance, block 634. Around the new center position, those points that make up the center are shifted the same amount, block 636. The process continues by calling the arms program that calculates the position of the arm for the original and altered model data, block 638. The process calculates the body center of gravity for the altered model, block 640 and determines the horizontal and lateral body center of gravity difference between the original and altered model, block 642. If these differences are less than 0.005 inches the procedure stops, block 644. If the difference is greater than 0.005, the horizontal and lateral offsets are set to the differences found in block 642 and the process continues by shifting the centers by the product of the center of gravity offset, center to foot center distance, and the ratio of the center to foot center distance and shoulder center to foot center distance, block 646. Eventually, the body center of gravity difference between the original and altered model in the horizontal and lateral directions will be less than 0.005 inches and iterative process stops.

The procedure then continues by normalizing the original model shoulder center to right ear distance, the center to left ear distance, and center to nose distance to the same size as the performer, block 650. The new ear and nose position is located by adding the distances of block 650 to the new model shoulder centered position, block 652. If any equipment is involved, block 654, the equipment position is shifted the same amount as segments that contact the equipment, block 656. If all the frames are completed, the process returns. If more frames are needed to be processed, the frame counter is incremented by one and the procedure begins again for a new frame at block 564, blocks 658 and 680.

f. Normalize-2 Program

The normalize-1 and normalize-2 programs are very similar. Where normalize-1 sizes a model to a performer, normalize-2 sizes a performer to a model. The normalize-2 program alters one performer to the body size of the model without significant alteration in the original performance. This program normalizes the performer displacement position data to match the body size of the model. The performance is altered only to allow for size changes between the model and the performer.

This program standardizes the segment length of the performer throughout the performance, using the standardized model segment length as the original guidelines. This will standardize the elite performance to the size of the model, without altering the performance except to accommodate size alterations.

Referring to FIG. 11A-C, the first step is to determine the original performer's center of gravity position for all frames. To maintain balance the altered performer must be repositioned horizontally and laterally to match the original body center of gravity position, block 700. If equipment is involved, the original equipment specifications are saved, blocks 702 and 704. The original performer segment positions that contact the equipment are subsequently saved, block 706. The left foot center position of the original performer is saved, block 708. The left foot center is used as the origin point for all displacement measurements. Thus, the final performance is repositioned at the same foot position as the original performer. The original displacement position results for the original performer are then saved, block 710. Since the original performer positions are needed to build a new performer, they are saved so that they can be recalled after the results are altered.

Subsequently, the average segment lengths of the model are calculated for all frames, block 712. The average segment length of flexible segments of the performer over all frames are calculated, block 714. The maximum trunk length of the performer and model during performance is calculated, block 716. The ratios between segment lengths of all flexible segments including the trunk are determined, block 717. The trunk ratio is generated using the maximum trunk lengths. All others are calculated using the average lengths.

The process then calculates segment lengths of the original performer for the current frame, block 718. The routine loops back to block 718 for calculating the following information for each frame until all the data for every frame is calculated. Next the ratios between segment lengths of frame and average segment lengths of the model are determined, block 720. The standard model segment results are passed to this program. These ratios are used to standardize the performer segment length to those of the model. As in normalize-1 routine, the original performers left toe to foot center distance is normalized to the same size as the model, block 722.

The new altered toe position is located by adding the altered left toe to foot distance to the original performer foot distance position, block 724. The original performer's left heel to foot center distance and left ankle to foot center distance is normalized to the same size as the model's. The new altered heel and ankle positions are located by adding the distance calculated in block 726 to the original performer's foot center position, block 728. The original performer's left ankle to knee center distance is normalized to the same size as the model, block 730. The new altered knee position is located by adding altered distance from block 730 to the new performer's ankle position, block 732. The medial to center distance and lateral to knee center distance of the original performers is normalized to the same size as that of the model, block 734. The new medial and lateral knee positions are located by adding distances rom block 734 to the new performer's knee center position, block 736. The original left knee to hip distance is normalized to the same size as the model for the performer, block 738. The new hip position is located by adding the distance from block 738 to the new performer's knee center position, block 740.

The original left hip to illiac distance is normalized to the same size as the model, block 742. The new illiac position is located by adding the distance to the new performance head position, block 744. The original left illiac to right illiac distance is normalized to the same size as the model, block 746. The new illiac position is located by adding the distance from block 746 to the new performer's left illiac position, block 748. The original right illiac to right hip distance is normalized to the same size as the model, block 750. The new hip position is located by adding the distance to the new performer's right illiac position, block 752. The original right hip to right knee center distance is normalized to the same size as the model, block 754. The new knee center position is located by adding the distance from block 754 to the new performer right hip position, block 756. The original performer's medial to knee center distance and lateral to knee center distance is normalized as the same size as the model's, block 758. The new medial and lateral knee position is located by adding the distances from block 758 to the new performer's knee center position. The original performer's right knee center to right ankle distance is normalized to the same size as the model, block 762. The new ankle position is located by adding the distance from block 762 to the new performer's right knee center position, block 764. The original performer's right ankle to toe distance and right ankle to heel distance is normalized to the same size as the model, block 766. The new toe and heel positions are located by adding distances from calculated in block 766 to the new performer's right ankle position.

Due to small errors, the right foot's vertical position may be slightly shifted from the original performer's vertical position. Thus the new performer is forced to the original vertical position for the toe, heel and ankle, block 770. The small vertical error is divided equally between the contributing leg segments (left and right upper and lower leg), block 772. To eliminate any final small errors, the new performer results are recentered around the left foot center, block 774.

Horizontal and lateral body center of gravity offset are set to zero before entering into a loop for determining whether the horizontal and lateral body center of gravity differences between the original and altered performer are less than the predetermined value, block 776. The original performer's illiac center to shoulder center distance is normalized to the same size as the model performer, block 778. The new shoulder distance position is located by adding the distance from block 778 to the new performer illiac centered position, block 780. The new center position of the illiacs, his, and right knee and left knee are located from the altered lower body results, block 782. The distances from the center point between the feet (foot center) and the shoulder, illiac, hip, and knee centers are generated, block 784.

The centers are shifted by the product of the center of gravity offset (which is initially at zero), center to foot center distance, and the ratio of the center to foot center distance and shoulder center of foot center distance, block 786. Around the new center position, those points that make up the center are shifted the same amount. Thus the segments are repositioned around a new center positions, block 788. A program for normalizing the performer's arm displacement position data to match the arm size of the model is called, in block 790. Next the body center of gravity is calculated for the altered performer, block 722. The horizontal and lateral body center of gravity differences between the original and altered performers are determined, block 794. If the horizontal and lateral differences are less than a predetermined error acceptability number, such as 0.005 inches, the center of gravity of the original and altered performer are matched and the loop continues to block 800. If the horizontal and lateral differences are greater than 0.005 inches, the horizontal and lateral offsets are set equal to their respective distances and the centers are shifted again as described in block 786. This process continues until the horizontal and lateral differences as previously stated are less than 0.005 inches. Eventually the differences will be less than 0.005 inches and the process continues by normalizing the original performer's shoulder center to right ear, center to left ear and center to nose to the same size as the model's, block 800. The new ear and nose positions are located by adding the distances from block 800 to the new performer's shoulder center position, block 802. If equipment is involved then the equipment position data are shifted the same amount as the segments that contact the equipment, blocks 804 and 806. For instance, if specific use of equipment is required, such as contact with the ball at a specific point, these positions must be attained. In this process, the possible error is small enough to let a small shift in equipment position with no alteration in the performer to achieve this goal. Finally, it is determined whether all the frames have been calculated. If not, the next frame is retrieved and the performer's displacement position data for that frame is matched to the body size of the model, blocks 808 and 810.

g. Arms-1 Program

This program normalizes the model arm displacement position data to match the arm size of any performer. The model performance is altered only to allow for size changes between the model and the performer. Referring to FIG. 12, the program starts by finding the center of the shoulder displacement position for the original model, block 850. Next the center of shoulder displacement position for the altered model, which has the segment lengths of the performer is found, block 852. The center of the wrists displacement position is calculated for the original model, block 854. The slope of the original shoulder center to wrist center position is computed, block 856. Next the distance between the wrists of the original model are calculated, block 858.

The left and right shoulder to elbow center distances for the original model are computed, block 860. Then the left and right shoulder to elbow center distances are computed for the altered model, block 862. The shoulder to elbow distances along the same line as the original model are altered to match the distances for the altered model, block 864. The new elbow center positions are located by adding the shoulder to elbow distances calculated on the original model to the altered shoulder positions, block 866.

The left and right elbow center to wrist center distances on the original model are computed, block 868. The left and right elbow center to wrist center distances are computed for the altered model, 870. The elbow to wrist distances along the same line of the original model are altered to match the distances for the altered model, block 872. The new wrist center positions are located by adding the elbow to wrist distances calculated on the original model to the altered elbow positions, block 874. The altered arms are then moved to the same relative distance as the original model, block 876.

Along the slope line that has been calculated, the arms are moved until the wrists are positioned the same relative distance from the line. The relative distance differs between activities, however it will either be the same width distance as the original wrist width (when equipment is held in the hand), or the ratio of the original shoulder width and the altered shoulder width multiplied times the original wrist width (when equipment is not held by the hands). Next the left and the right medial and lateral elbow positions are computed from the final elbow center positions, block 878.

As in the normalized programs, beginning from the center origin, the distance from the origin to the point in question for the model is altered to equal the same distance from a center to the point in question on the performer. This is done by multiplying the segment ratio (data from the normalized program) and the model length for this distance, then repositioning the point by adding the length to the center. Next the left and right medial and lateral wrist positions from the final wrist center positions are computed, block 880. Finally, left and right hand centered positions are computed from final wrist centered positions, block 882. The process then returns from the program that called it.

h. Arms-2 Program

The Arms-2 Program normalizes the performer's arm displacement position data to match the arm size of the model. The performer data are altered only to allow for size changes between the model and the performer. Referring to FIG. 13, the Arms-2 Program is similar to the Arms-1 Program and begins by finding the center of the shoulder displacement position for the original performer, block 900. The center of the shoulder displacement position for the altered performer is computed, block 902. The center of the wrists displacement position for the original performer is computed, block 904. The slope of the original shoulder center to wrist center positions are computed, block 906. The distances between the wrists of the original performer are calculated, 908. The left and right shoulder to elbow center distances for the original performer are computed, block 910. The left and right shoulder to elbow center distances for the altered performer are computed, block 912.

Next, the shoulder to elbow distances along the same line of the original performer are altered to match the distances for the altered performer, block 914. The new elbow center positions are located by adding distances computed from the original model to the altered shoulder positions, block 916.

The left and right elbow center to wrist distances for the original performer are computed, block 918. The left and right elbow center to wrist center distances for the altered performer are computed, block 920. The elbow to wrist distances, along the same line of the original performer, are altered to match the distances for the altered performer, block 922. The new wrist center positions are located by adding the distances computed from the original model to altered elbow positions, block 924. The altered arms are moved to the same relative distance as the original performer, block 926.

Along the slope line that has been calculated, the arms are moved until the wrists are positioned the same relative distance from the slope line. The relative distance differs between activities, however it will either be the same width distance as the original wrist width (when equipment is held in the hand), or the ratio of the original shoulder width and the altered shoulder width multiplied times the original wrist width (when equipment is not held by the hand). The left and right medial and lateral elbow positions are computed from the final elbow center positions, block 928. As in the normalized routine, beginning from the center origin, the distance from the origin to the point in question for the performer is altered to equal the same distance from the center to the point in question on the model. This is done by multiplying the segment ratio (data from the normalize program) and the performer length for this distance, then repositioning the point by adding the length to the center. The left and right medial lateral wrist positions are calculated from the final wrist center positions, block 730. Finally, the left and right hand center positions are computed from the final wrist center positions, block 932.

2. Process to generate individualized superior performance model

FIG. 14 is the overall flow chart for generating the individual performance model for the student. The first step begins by capturing the student on video and digitizing the video image for generating a model of the student. Note that is not necessary to capture the student trying to accomplish the skill or activity but the purpose is to generate a model of the physical dimensions and characteristics of the student's body, block 940. The next step sizes the superior performance model previously generated to the physical dimensions of the student. This creates an individual superior performance model having the same size as the student and capable of superior performance in accomplishing the skill, block 942. The final step is to display the individual superior performance model to compare with the student's image. This is either done by using the on-line teaching process or the video performance overlay process, block 944.

a. Digitized Program

The digitized program digitizes the body points and scales the data necessary to build an individualized superior performance model. All the work for digitizing the body points is done using video results from camera. Referring to FIG. 15, the first step is to clear the graphic screen connected to the image processor. Instructions are presented from the image processor software to perform the digitizing task in a manner well known in the art, block 950. Necessary data describing the performer are entered. Typical data include the name of the performer, the activity of the performer, the date, the collection technique, etc., block 952. The next step is to determine whether a scale file is available for scaling the image of performer. If the scale file is not available, the scale file is generated by placing a scale factor in each of the camera's view. A scale factor may include placing a known dimensional object as simple as a yardstick, or as complex as a multi-segment scale factor in the view of the cameras for generating a scale. The camera view is displayed with the scale factor on the screen, block 956. Next the scale points are digitized from the camera one view, block 958. The scale factor in the camera two view direction is displayed and digitized, blocks 960 and 962. The necessary scale position points are digitized from the display on the graphic screen. The number of points are determined by either the DLT method or 90° camera offset method. While generating the scale factor information, the data are read into the computer and stored on a file, block 964. The scale factor results are entered to provide the sizing data to scale performer results to full scale. After generating a scale file it is determined whether the performer is to be digitized, block 966. If the performer is not to be digitized the procedure for digitizing the performer is skipped and the scale data generated is written on to a data file, block 988. If the performer is to be digitized the camera one view is displayed with the performer, block 968. The performer is placed in front of the cameras in a position that best allows all the body points to be seen by both cameras. The critical body segment points on the performer are digitized by either using a cursor moved by a trackball, mouse, keyboard or by using a wand interfaced to the image processor in a manner well known in the art, block 970. The camera one view is displayed with the performer and the graphic results of the digitizing effort to ensure that the results are acceptable, block 972. If the points are not acceptable, the procedure is repeated, block 974.

If the points are acceptable the camera two view is displayed with the performer and the view of the performer in the camera two view is digitized, block 976 and 978. The critical body segment points on the camera view are digitized by using the trackball, mouse, or keyboard commands, or a wand on the image processor. The camera two view is displayed with the performer and the graphic results of the digitizing effort to ensure that the results are acceptable. If the points are not acceptable, the procedure is repeated again, block 982. If the points are acceptable the performer position data is scaled, block 984. The performer position data is written to a file along with the scaled data, blocks 986 and 988. The procedure then finishes by writing the data to an appropriate file on the computer system.

Digitizing with two cameras is the norm, but results can be generated using any number of cameras. If one camera is used, however, the performer must pose in two positions.

b. Program E

Program E takes the superior performance model and individualizes it to the body size of any performer. Referring to FIG. 16 first step is to read the model displacement position data generated by Programs A through D, block 1000. Next, the performer segment position sizing data generated by the digitized program are read, block 1002. If any equipment is involved the performer equipment specifications are read, block 1004 and 1006. Since the altered model must match the performer's equipment specifications they are retained. An option may be added to allow the model equipment to be the final recommendation. Next, the camera placement data is read, block 1008. This is required to generate the three-dimensional performer position.

As described in Program A, there are two possible methods used to generate the three-dimensional results. These are the DLT method and 90° camera offset. Since they were explained before with respect to Program A they will not be repeated here. The three-dimensional performer position data is generated using either the DLT method or the 90° camera offset, blocks 1010, 1012 and 1014. The performers position is centered around a predetermined body position, such as the left foot, block 1016. The performer's position is normalized using a normalize-3 routine. The normalize-3 routine alters the model to the body size of another performer without significant alteration in the original performance. The normalize-3 program normalizes the model displacement position data to match the average body segment size of the performer. Thus the model performance is altered only to correct for segment size differences errors between the performer and the model, block 1018. Next the center of gravity results for the model performance are generated, block 1020. The model position results are fit with a cubic spline function, block 1022. As was explained in Program A, a cubic spline function is fit to the final displacement position results. This allows smoothing as well as a possibility of regenerating results at any required time rate. The model position results are regenerated using the video time increments, block 1024. Using the cubic spline function for each result, the data are regenerated in video timed increments, 1/60th of a second, so that the data can be overlayed on video results. Since the result will be shown with video, paralax must be replaced to match the paralax inherent in the video image. The cameras placement results previously read in are used to accomplish this task, block 1026. The model results are centered around the left foot center, block 1028.

Thus the superior performance model is individualized to the body size of the performer. If any equipment is involved in the activity, the model position results for the equipment are generated and saved on a data file, blocks 130 and 132. Finally, the model position results are written to the data file, block 1034. Briefly, this superior performance model is individualized to the body size of the performer and appropriate data describing the model position and movement are written to a data file to be used for displaying on a video monitor.

c. Normalize-3 Program

The normalize-3 routine is designed to alter the model to the body size of another performer without significant alterations in the original performance. This program normalizes the model displacement data to match the body segment size of the performer. Thus the model performance is altered only to correct segment size differences between the performer and the model.

Figure 17C:
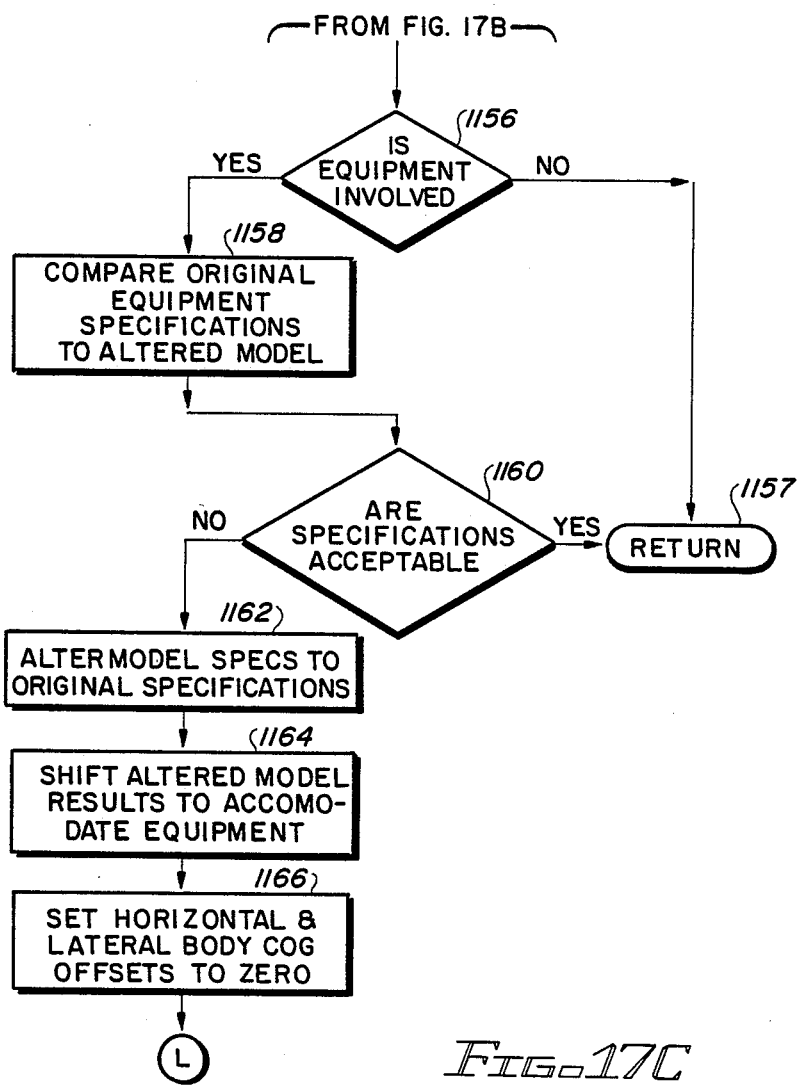

The normalize-3 routine is virtually identical to the normalize-1 routine. For a complete discussion of the normalize-1 routine reference is made to FIGS. 10A-C. Consequently the normalize-3 discussion will only discuss those steps which are different than the normalize-1 process. Referring to FIG. 17, to standardize the segments that remain constant length, the lengths of all of the performer's segments are determined for all of the frames, block 1050.

The standard model segment length results are passed to the normalize-3 routine. A ratio between performer and model segment length is determined for each involved segment. This ratio is used to standardize the model segment lengths to those of the performer, block 1052. Since the segment length of the head and trunk can change due to the flexible vertebral column, these lengths are not forced to a standardized length. In the normalize-3 routine, any head or trunk length alteration is assumed to be due to vertebral flexibility and, thus the head and trunk lengths are allowed to change size, using the ratio only as a guideline for average length over all frames. To maintain balance the altered model is repositioned horizontally and laterally to match the original body center of gravity position. To accomplish this, the original position is saved, block 1054. Since the altered model must have the same equipment specifications as the performer, and the same origin part point for all displacement measurements, the original model equipment specifications, segment positions that contact equipment, left foot center position and displacement position results are saved, blocks 1058–1064. The routine then continues as the normalize-1 routine procedure to normalize the model displacement position data to match the average body segment size of the performer for all frames, blocks 1066–1154.

After all the frames are completed, the routine determines whether any equipment is involved, block 1156. If no equipment is involved the routine makes a normal return, block 1157. If equipment is involved, the original equipment specifications previously saved are compared to the altered model, block 1158. If the equipment specifications are acceptable for the altered model the return makes a normal return, blocks 1157 and 1160. Since the altered model can be required to have the same equipment specifications as the performer, the final altered model may have to be further manipulated to accommodate equipment demands, block 1162. If required, the model is shifted to accommodate the required equipment demands, block 1164. Since shifting the body position may upset the body balance, the new altered position is processed through the portion of the routine that balances the altered model using the original model center of gravity position, block 1166. The result is an altered model shifted to accommodate the altered equipment position having the original model's center of gravity position. The procedure then terminates by returning to the envoking procedure.

3. Video Overlay Program

The overlay program overlays the individual model results over the video of the performer. Referring to FIG. 18, the first step is to clear the graphic screen, block 1200. Next the performer data are input into the computer. Typical data include name, activity, date, collection technique, etc. The performer's individualized superior performance model data are read from the data file generated by program E, block 1204. If a scale file is not available to scale the performer's results to the size of the video display (graphics) screen, the scale factor is determined as described in the digitized program, blocks 1106≧1114. If the scale file is available it is read directly from the scale data file, block 1216.

After the appropriate scale file information has been determined, the performer position data is scaled, block 1218. Thus, the actual performance data are altered to fit the video display. The camera one view is projected on to the video display with a reference point inherent in the performance such as a golf tee, pitching rubber, home plate, etc. All graphics display results are referenced to this point, block 1220. The individual performance model is overlayed on the video position and positioned using the reference point, block 1222. The camera two view is displayed with the reference point chosen, 1224. The individualized performance model is displayed and positioned with regards to the reference point, block 1226.

Thus, the video display screen displays the individualized superior performance model positioned with regards to a reference point. The next step is to select a mode for teaching the student. Either the overlay mode or the on-line teaching mode is selected, block 1228. If the on-line teaching mode is selected either the camera one view or the camera two view is selected, block 1230. If the camera one view is selected, the camera one view is displayed, block 1232. In the teaching mode, any of the model positions can be selected to be overlayed on the video results from either camera. These positions can be altered at any time, block 1234. The model is then overlayed on the video screen, block 1236. At this point, the student can try to match his body to the individualized superior performance model on the video. The teacher can correct the student's position or the student can easily correct his own position by viewing the monitor at the teaching site and comparing his position with the model's position. Eventually the student will want to alter his position. The model's position is altered to the position desired, block 1238. If the student desires to alter the view he may do so, block 1248. The procedure then loops back to the teaching mode to select a view from either camera one or camera two, block 1230. If the student desires not to look at a different view or proceed to the overlay mode, block 1250, the scale file data originally generated is saved for later use, block 1252.

The entire on-line teaching process, or any part, can be saved on tape by simply recording the output from the cameras or the image processor. The results can be viewed either during or after the session.

The student may wish to compare his performance to that of the model. This is accomplished by using the video overlay mode, block 1254. In the video overlay mode, to match the model performance to that of the performer, the time that the performer reaches the critical position must be identified. This is accomplished by identifying the key positions of the performer and determining the time that the performer reaches these key positions during the physical activity. For instance, as the performer swings, the 10 key positions of the golf swing can be easily identified and the time for each key position can be easily determined. Next the view is selected from either camera one or camera two, block 1256. Since either the view from camera one or camera two can be selected the discussion will describe the camera two view. It is to be understood that the same procedure is followed for the camera one view, blocks 1268–1276.

Once the view is selected the frame count is initialized to the beginning frame, block 1258. The video image from the selected frame is displayed, block 1260. The corresponding model graphics position is overlayed onto the video image, block 1262. The model frames are determined by identifying the key positions of the swing in the performer. Since the key positions in the model are known, and the key positions can be easily identified in the swing of the performer the appropriate model frame can be overlayed on the image of the performer. Next the frame is incremented and the procedure is repeated again until all frames are completed, blocks 1264 and 1266. Eventually the student may wish to alter the view and look at view 2 which is shown in block 1268. If the student wishes to go back to the teaching mode and improve his performance before doing video overlay he can do so, block 1280.

As in the on-line teaching mode, all results can be recorded for viewing immediately or at a later time.

As in all other examples, two cameras are the norm in both the teaching and the overlay methods, however, any number can be used. If any one camera is used, however, the performer will have to reposition the direction of the performance, or reposition the camera if more than one view is wanted.

G. GOLF OPERATION EXAMPLE

In operation, the student desiring to learn the skill is positioned in front of the cameras so that a digitized image can be made of the student. The digitized image is used to generate an individualized superior performance model sized to the physical dimensions of the student. The first process of teaching the student to accomplish the skill is by using an on-line teaching process to allow the immediate comparison between the student's performance and the individualized superior performance model. The student, preferably with a teacher to help demonstrate the physical actions, view the image of the student and the model at a monitor located conveniently at the teaching site. For instance, in golf, the monitor is conveniently located near the golf tee. In the on-line teaching mode, the computer displays the individualized superior performance model at a particular position in which the student wishes to improve his skill.

Referring to FIG. 19, shown are the ten key positions in the swing of a golfer. An image of an individualized superior performance model 8 is overlayed on a student's image 4 (shown by phantom lines). If the student wishes to address the ball properly, the computer displays the model's address position (Position A on FIG. 19) on the video monitor. The student can then adjust his address position to coincide with the model's image on the video screen. Since the model is of the exact physical dimensions, same body center of gravity, and size as the performer, the performer is capable of moving his body to overlay exactly the image of the model on the monitor.

In the stationary position, like setup or beginning positions, the student or teacher can see the differences and make immediate changes. In positions reached while moving, the computer brings up the position for the student to reach and the student can be placed in a stationary position to demonstrate the feel of the position. The student can perform the activity while the teacher uses the monitor to determine whether the selected position is reached. At any time, the video image can be switched to another view such as the side view, with the model switching to the proper position at that time for displaying a side view.

The entire on-line teaching process, or any part, can be saved on tape by simply recording the output from the cameras or the image processor. The results can be viewed either during or after the session.

The second way of operating this system is to produce a video overlay of the student performing the activity. The video overlay produces a hard copy video record of the performance of the student with the individualized superior performance model overlayed. Referring to FIG. 19 there is shown an example of the video performance overlay for the ten key positions of golf. In this example, the student has addressed the ball and made a complete swing through impact to follow through. The model is overlayed on the student's activity so that the student can compare his activity with a superior performance.

Essentially, he student compares his swing to a perfect swing for the size of his body. FIG. 19 shows the ten key positions for a perfect golf swing. Position A is the address position in which the model bends slightly from the waist and knees. Position B is the horizontal backswing where virtually the entire body shift takes place. The model turns the hips triggering a one piece takeaway, the arms and shoulders and promotes the shifting of the weight to the right foot. Position C is the vertical backswing in which emphasis is placed on coiling the body. As the model's left arm bends slightly and the right arm "flies" just a little, most of the wrist cock takes place. Position D is the parallel top of swing position. The model moves the club from a vertical to a parallel position with the head remaining almost perfectly still. The hips and upper body have coiled fully. Note that the student has overextended the backswing thus causing his club to rotate further than the model's. This will eventually cause the club to be late at impact, causing the golfer to push the ball to the right. Position E is the vertical downswing. During the first move down, the arms are taken down by the body. The shifting action back to the left happens between the top of the swing and the vertical downswing position. Position F is a horizontal downswing. As the left side clears, the head stays relatively still and behind the ball. The free swinging action of the arms and club is caused by the including of the hips and upper body. Position G is the impact position. This is where the ball is struck.

From the horizontal downswing position to the end of the swing, nearly all of the body's movement is towards the target. H is the horizontal throughswing. The model's right hand is crossing over the left and right foot has lifted almost fully off the ground. Both actions are caused by rolling the weight to the outside of the left foot. It is this move that pulls the golfer through. Position I is a vertical through swing position. Clearing the hips allowing the arms and club to swing freely through to the vertical position. At this point, the club is slowing down and the wrists are beginning to break. The body is straightening out but the head remains behind the ball's original position. The final position J is the finish. The belly button points to the left of the target and not directly at it. If the chest does face the target, it means the hips haven't cleared properly. As the waist breaks down and elbows fold, the club falls to the finish position.

This example shows only the ten positions overlayed on the student. In reality, every video frame of the student has the corresponding model position overlayed. Thus, the model swings with the student, making comparisons at all positions a simple task.

Thus, as is clearly obvious, the student has a direct comparison of his swing to the individualized superior performance model's swing. The student and/or teacher can easily correct any deficiencies for improving his swing. In addition, other students may view the video hardcopy for critique purposes. Another use of the video hardcopy includes using the student's previous video hardcopies for illustrating the students improvement in learning skills.

H. CONCLUSION

Thus, there has been shown a system and method for teaching a student a physical skill by overlaying an individual superior performance model on the activity of the student. The student with the aid of a teacher, improves his performance by comparing his performance to that of a individualized superior model. The individualized superior performance model includes movement patterns of elite performers in the activity, superior trends identified from the activity, and any trends employed by the elite performers in superiorly performing the activity. The individualized superior performance model is sized to the physical dimensions and characteristics of the student. Thus the student can compare his movements to a model specifically individualized for the student's activity.

The physical skills that can be learned by a student include sports and games. For instance, the system and method is particularly appropriate for teaching a student the proper swing of a golf club, the proper form for sprinting or high hurdles, the proper form for pole vaulting, the correct form for pitching a baseball, the correct form for swinging a baseball bat to increase distance and direction, and numerous other skills.

The video hardcopy can be saved to illustrate the improvement of the student in learning the skill. Also, the video hardcopy can be viewed by others for obtaining valuable information on the biomechanical aspects of the learning technique. The above described embodiment of the invention is illustrative only, and that modifications thereof may occur to those skilled in the art. Accordingly, this invention is not to be regarded as limited to the embodiment disclosed therein, but is to be limited as defined by the appended claims.

What is claimed is:

1. A method for teaching a physical skill to a person, said method comprising the steps of:
    permitting the person to perform the physical skill without attaching radiation emissive devices to the parts of the person's body involved in the skill;
    capturing a video image of the person performing the physical skill without detecting radiation emissions from devices attached to the parts of the person's body involved in the skill;
    projecting onto a video display a first video image of the person endeavoring to accomplish the skill;
    projecting simultaneously on the same video display a second video image of a model accomplishing the same skill while scaling the second video image of the model to the physical dimensions of the first video image of the person;
    comparing the second video image of the model to the first video image of the person; and
    attempting to correct the person's performance of the physical skill to coincide with that of the model.

2. The method of claim 1, wherein the center of gravity of said model is balanced for the demands of the physical activity.

3. The method of claim 1, wherein said second video image is representative of a plurality of persons chosen from a predetermined group of persons who perform the skill in a superior manner.

4. The method of claim 3, further including the steps of:
   identifying superior characteristics in the performances of the persons in the group; and
   adding representations of the superior characteristics to the second video image for generating a representation of superior model performance.

5. The method of claim 1, further comprising the step of superimposing the second video image on the first video image with the physical dimensions of the second video image representing the model coinciding with the physical dimension of the first video image representing the person.

6. The method of claim 5, further including the step of coordinating the first and second video pictures representing the movements of various parts of the model's body and the person's body simultaneously at the same video display rate.

7. The method of claim 6, wherein the physical skill comprises running.

8. The method of claim 6, wherein the physical skill includes a manipulation of equipment and wherein said method further includes the step of coordinating a representation of the manipulation of the equipment by the model in the second video image with a representation of the manipulation of the equipment by the person in the first video image.

9. The method of claim 8, further including the step of superimposing the second video image of the equipment manipulation of the model to coincide with the first video image of the equipment manipulation by the person.

10. The method of claim 9, wherein the physical skill comprises an athletic event such as the swinging of a golf club.

11. The method of claim 9, wherein the physical skill comprises swinging a baseball bat.

12. The method of claim 1, further comprising the steps of:
   initially recording the first video image of the person prior to simultaneously projecting the first and second video images; and thereafter
   simultaneously projecting the recording of the first video image with the second video image, so that the person can view and compare his or her recorded performance with that of the model.

13. A system for teaching a physical skill to a student, said system comprising:
   a video camera;
   a decoding means;
   a processing means;
   a storage means for storing a representation of a model accomplishing the skill;
   a display means;
   said video camera positioned for generating a video signal to provide a sequence of video images representative of the movement of a student attempting to perform the physical skill without radiation emissive devices attached over that part of the student's body involved in the skill;
   said decoding means converting said video image signal to pixel image data for effecting an input into said processing means;
   said processing means simultaneously matching the movement of the student to an output from said storage means representing the model accomplishing the skill, said processing means generating a pixel image representation of the movement of the model and the movement of the student, wherein the model's physical characteristics coincides with the student's physical characteristics; and
   said display means displaying said pixel image for comparing the student's movement to the model's movement whereby the student, learns the skill by attempting to duplicate the model's movement.

14. The system of claim 13, wherein said processing means includes a digital computation means for computing the orientation and position of the model and providing digital signals representative thereof.

15. The system of claim 14, wherein said processing means includes an image processing means responsive to said digital signals and said pixel image data from said decoder for combining said digital signals with the pixel image data for generating a pixel image of the model and the performer.

16. The system of claim 15, wherein said computation means includes:
   a central processing unit means for performing arithmetic operations on information in said processing means; and
   a memory means for controlling the sequence of operation of said processing means and for storing information.

17. The system of claim 14, further including a means for providing input information to said image processing means.

18. The system of claim 13, further including a first video recorder for recording the video signal from said camera and adapted to playback said video signal for repeating the movement of the student.

19. The system of claim 13, further including an encoding means for converting the pixel image data to a video signal.

20. The system of claim 19, further including at least one video monitor for converting said video signal to a video image.

21. The system of claim 13, wherein said encoding means is a RGB to NTSC converter.

22. The system of claim 13, wherein said decoding means is an NTSC to RGB connector.

* * * * *